(12) United States Patent
Coombs et al.

(10) Patent No.: US 10,160,278 B2
(45) Date of Patent: Dec. 25, 2018

(54) SYSTEM AND METHOD FOR VEHICLE STABILIZATION

(71) Applicant: Aktv8 LLC, Brighton, MI (US)

(72) Inventors: Joshua Coombs, Brighton, MI (US); Timothy Williams, Brighton, MI (US); Gary Meyers, Brighton, MI (US)

(73) Assignee: Aktv8 LLC, Brighton, MI (US)

( * ) Notice: Subject to any disclaimer, the term of this patent is extended or adjusted under 35 U.S.C. 154(b) by 85 days.

(21) Appl. No.: 15/407,963

(22) Filed: Jan. 17, 2017

(65) Prior Publication Data

US 2017/0120712 A1    May 4, 2017

Related U.S. Application Data

(63) Continuation-in-part of application No. 14/971,520, filed on Dec. 16, 2015, now Pat. No. 9,834,056.
(Continued)

(51) Int. Cl.
*B60G 17/015* (2006.01)
*B60G 11/27* (2006.01)
(Continued)

(52) U.S. Cl.
CPC ........... *B60G 17/0155* (2013.01); *B60G 5/00* (2013.01); *B60G 11/27* (2013.01); *B60G 17/005* (2013.01);
(Continued)

(58) Field of Classification Search
CPC ...... B60G 17/0155; B60G 5/00; B60G 11/27; B60G 17/005; B60G 17/017; B60G 17/052; B60G 17/0526
See application file for complete search history.

(56) References Cited

U.S. PATENT DOCUMENTS

| 3,766,935 A | 10/1973 | Clippard |
| 3,836,161 A | 9/1974 | Buhl |

(Continued)

FOREIGN PATENT DOCUMENTS

| CA | 2446111 | 7/2005 |
| CA | 2818422 | 12/2014 |

(Continued)

OTHER PUBLICATIONS

Volvo Trucks Adaptive Loading, https://www.youtube.com/watch?v=mbwSIN9Pbig, published Mar. 30, 2015.
(Continued)

*Primary Examiner* — Faye M Fleming
(74) *Attorney, Agent, or Firm* — Jeffrey Schox

(57) ABSTRACT

A vehicle stabilization system including a frame; a wheel; a control arm connected to the frame and the wheel; a fluid spring connected to the frame and the control arm; a stabilizer connected to the frame and operable between a retracted and extended position; a reservoir; and a fluid manifold connected to the fluid spring and the chamber, fluidly coupling the spring interior and stabilizer chamber to the reservoir interior. A vehicle stabilization method including maintaining an orientation of the vehicle frame, coupling the frame to a support surface using a stabilizer by introducing a fluid to a chamber of the stabilizer, and retracting a wheel by reducing a quantity of fluid within a fluid spring coupling the wheel to the frame.

20 Claims, 14 Drawing Sheets

Related U.S. Application Data

(60) Provisional application No. 62/092,723, filed on Dec. 16, 2014, provisional application No. 62/119,740, filed on Feb. 23, 2015, provisional application No. 62/195,083, filed on Jul. 21, 2015, provisional application No. 62/279,533, filed on Jan. 15, 2016.

(51) Int. Cl.
  *B60G 17/005* (2006.01)
  *B60G 17/052* (2006.01)
  *B60G 5/00* (2006.01)
  *B60G 17/017* (2006.01)

(52) U.S. Cl.
  CPC ......... *B60G 17/017* (2013.01); *B60G 17/052* (2013.01); *B60G 17/0523* (2013.01); *B60G 17/0526* (2013.01); *B60G 2202/152* (2013.01); *B60G 2202/412* (2013.01); *B60G 2206/0116* (2013.01); *B60G 2206/80* (2013.01); *B60G 2206/81012* (2013.01); *B60G 2206/91* (2013.01); *B60G 2300/402* (2013.01); *B60G 2400/51* (2013.01); *B60G 2400/51222* (2013.01); *B60G 2400/60* (2013.01); *B60G 2401/172* (2013.01); *B60G 2800/01* (2013.01); *B60G 2800/20* (2013.01); *B60Y 2400/15* (2013.01); *Y10T 137/877* (2015.04); *Y10T 137/87885* (2015.04)

(56) References Cited

U.S. PATENT DOCUMENTS

| | | |
|---|---|---|
| 4,488,343 A | 12/1984 | Kobelt |
| 4,782,878 A | 11/1988 | Mittal |
| 4,782,879 A | 11/1988 | Le Chatelier et al. |
| 4,854,409 A | 8/1989 | Hillebrand et al. |
| 4,867,474 A | 9/1989 | Smith |
| 4,923,210 A | 5/1990 | Heider et al. |
| 5,467,595 A | 11/1995 | Smith |
| 5,540,268 A | 7/1996 | Mittal |
| 5,629,873 A | 5/1997 | Mittal et al. |
| 5,629,874 A | 5/1997 | Mittal |
| 5,904,172 A | 5/1999 | Gifft et al. |
| 5,959,365 A | 9/1999 | Mantini et al. |
| 6,000,765 A | 12/1999 | Hinz et al. |
| 6,003,885 A | 12/1999 | Richardson |
| 6,240,339 B1 | 5/2001 | Von Mayenburg et al. |
| 6,364,340 B1 | 4/2002 | Taylor |
| 6,371,227 B2 | 4/2002 | Bartlett |
| 6,398,236 B1 | 6/2002 | Richardson |
| 6,513,819 B1 | 2/2003 | Oliver et al. |
| 6,572,124 B2 | 6/2003 | Mlsna et al. |
| 6,746,031 B2 | 6/2004 | Carlstedt |
| 6,796,566 B2 | 9/2004 | Vandenberg |
| 6,810,982 B2 | 11/2004 | Kuhn et al. |
| 6,830,250 B2 | 12/2004 | Cervantez et al. |
| 6,845,989 B2 | 1/2005 | Fulton et al. |
| 6,997,464 B2 | 2/2006 | Yakimishyn |
| 7,222,867 B2 | 5/2007 | Rotz et al. |
| 7,281,721 B2 | 10/2007 | Hudson et al. |
| 7,331,592 B2 | 2/2008 | Heer |
| 7,396,201 B2 * | 7/2008 | Pollnow .................. B60P 1/025 414/482 |
| 7,437,920 B2 | 10/2008 | Beverly et al. |
| 7,568,710 B2 | 8/2009 | Ramsey |
| 7,731,208 B2 | 6/2010 | Strong |
| 7,845,659 B2 | 12/2010 | Hudson et al. |
| 7,959,173 B1 | 6/2011 | Morroney |
| 8,002,065 B2 | 8/2011 | Glavinic et al. |
| 8,177,010 B2 | 5/2012 | Glavinic et al. |
| 8,364,399 B2 | 1/2013 | Wendling et al. |
| 8,413,997 B1 | 4/2013 | Coombs et al. |
| 8,434,773 B2 | 5/2013 | Morris et al. |
| 8,695,998 B1 | 4/2014 | Karel et al. |
| 8,827,287 B2 * | 9/2014 | Michel .................. B60G 11/183 280/124.106 |
| 8,840,119 B2 | 9/2014 | Davis |
| 8,892,307 B2 | 11/2014 | Fazzalari et al. |
| 8,905,071 B2 | 12/2014 | Coombs et al. |
| 8,931,507 B2 | 1/2015 | Murakami et al. |
| 8,931,788 B2 | 1/2015 | Becke et al. |
| 8,935,054 B2 | 1/2015 | Mantini et al. |
| 8,967,646 B2 | 3/2015 | Schwarz et al. |
| 9,022,404 B2 | 5/2015 | Risse et al. |
| 9,358,848 B2 | 6/2016 | Voith et al. |
| 9,370,137 B2 | 6/2016 | Hennes |
| 9,415,652 B2 | 8/2016 | McGuire |
| 9,422,014 B1 | 8/2016 | Schuck |
| 9,469,303 B2 | 10/2016 | Czaja et al. |
| 9,475,355 B2 | 10/2016 | Layne et al. |
| 9,481,415 B2 | 11/2016 | Clayton et al. |
| 9,533,540 B2 | 1/2017 | Lindsay |
| 9,598,126 B2 | 3/2017 | Strong et al. |
| 9,636,954 B2 | 5/2017 | Therber et al. |
| 2002/0020979 A1 | 2/2002 | Smith et al. |
| 2002/0038193 A1 | 3/2002 | Grunberg et al. |
| 2004/0079557 A1 | 4/2004 | Saxon et al. |
| 2005/0269753 A1 | 12/2005 | Geiger et al. |
| 2007/0080514 A1 | 4/2007 | Stender et al. |
| 2007/0296173 A1 | 12/2007 | Regnell et al. |
| 2008/0224428 A1 | 9/2008 | Smith et al. |
| 2008/0269986 A1 | 10/2008 | Regnell et al. |
| 2011/0031712 A1 | 2/2011 | Bitz et al. |
| 2012/0097282 A1 | 4/2012 | Coombs et al. |
| 2013/0253814 A1 | 9/2013 | Wirthlin |
| 2014/0107892 A1 | 4/2014 | Coombs et al. |
| 2016/0221492 A1 | 8/2016 | Stender et al. |
| 2017/0016757 A1 | 1/2017 | Strong et al. |
| 2017/0021687 A1 | 1/2017 | Youngers et al. |

FOREIGN PATENT DOCUMENTS

| | | | |
|---|---|---|---|
| CA | 2881526 A | 8/2016 | |
| DE | 102015008390 | 12/2016 | |
| EP | 308391 A1 * | 9/1988 | .......... B60G 21/055 |
| EP | 1882600 | 1/2008 | |
| EP | 1502778 | 5/2013 | |
| JP | 2010260470 | 11/2010 | |
| WO | 2010151207 A1 | 12/2010 | |
| WO | 140672 | 10/2012 | |
| WO | 156996 | 11/2012 | |
| WO | 181160 | 11/2014 | |
| WO | 0058274 | 4/2015 | |
| WO | 079292 | 6/2015 | |
| WO | 2016210099 | 12/2016 | |
| WO | 001017 | 1/2017 | |

OTHER PUBLICATIONS

WABCO exhibits new product range at IAA, Sep. 2012, globaltrailermag.com, http://www.globaltrailermag.com/news/article/wabco-exhibits-new-product-range-at-iaa.

International Search Report and Written Opinion for International Application No. PCT/US18/12393 dated Jun. 20, 2018.

* cited by examiner

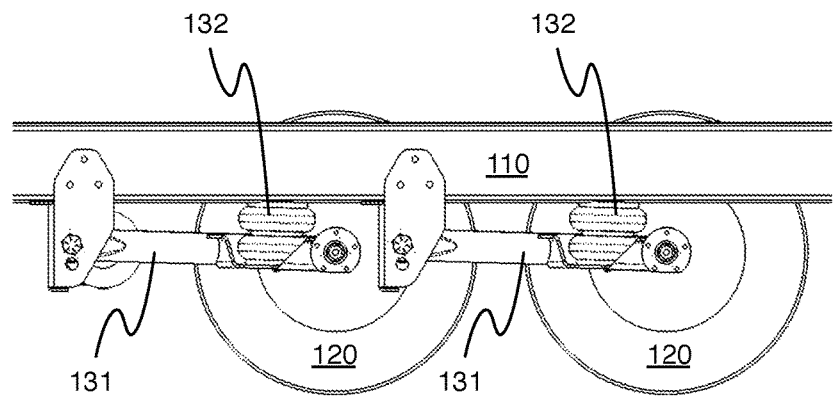
FIGURE 4A
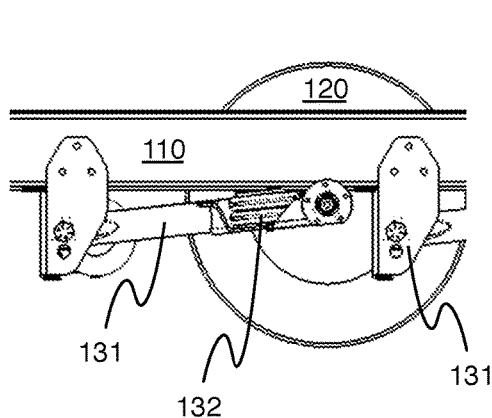
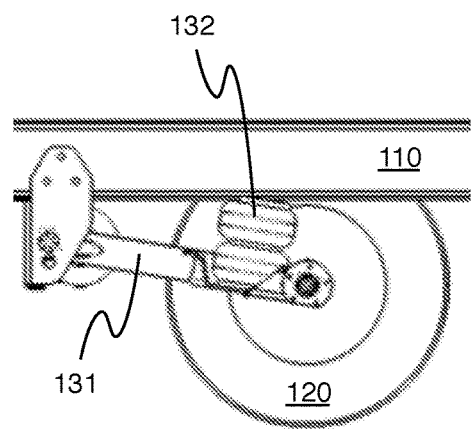
FIGURE 4B          FIGURE 4C

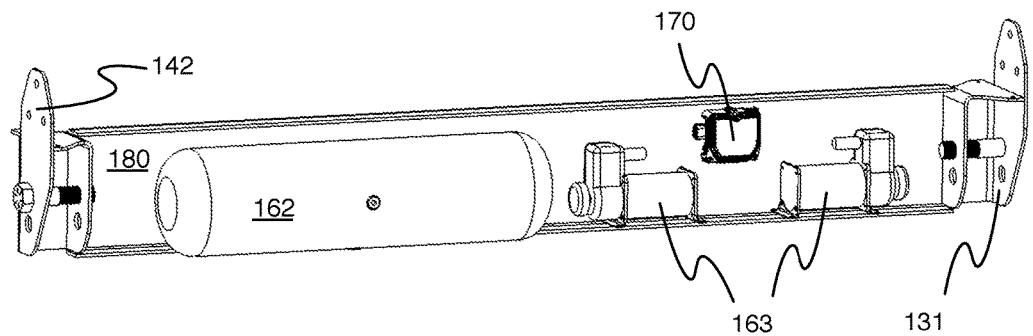
FIGURE 10A
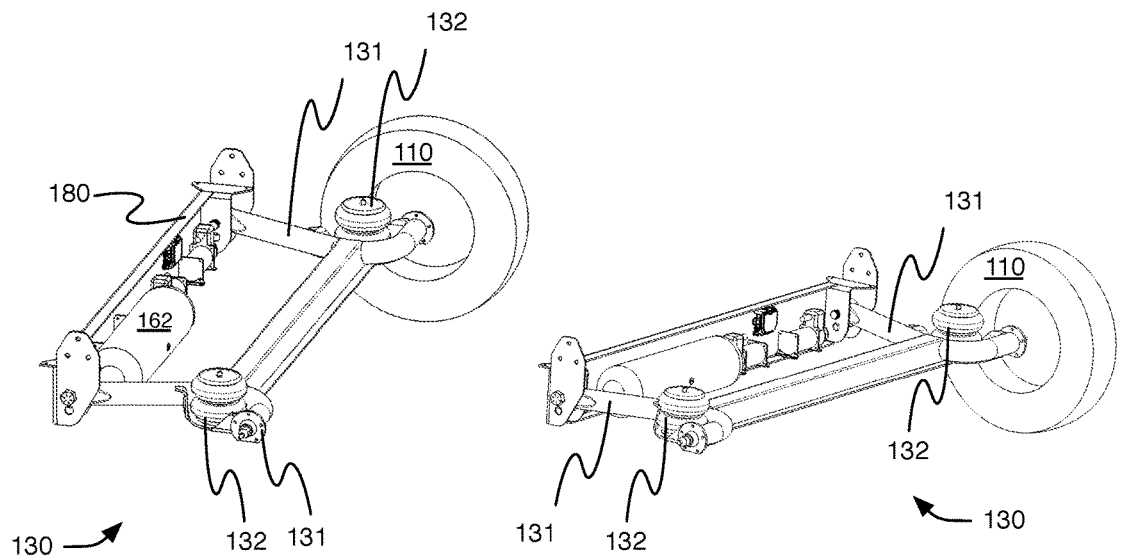
FIGURE 10B  FIGURE 10C

SYSTEM AND METHOD FOR VEHICLE STABILIZATION

CROSS-REFERENCE TO RELATED APPLICATIONS

This application is a continuation-in-part of prior U.S. application Ser. No. 14/971,520, filed on 16 Dec. 2015, which claims the benefit of U.S. Provisional Application Ser. No. 62/092,723 filed 16 Dec. 2014, U.S. Provisional Application Ser. No. 62/119,740 filed 23 Feb. 2015, and U.S. Provisional Application Ser. No. 62/195,083 filed 21 Jul. 2015, each of which is incorporated in its entirety by this reference.

This application claims the benefit of U.S. Provisional Application Ser. No. 62/279,533, filed on 15 Jan. 216, which is incorporated in its entirety by this reference.

TECHNICAL FIELD

This invention relates generally to the vehicle stabilization field, and more specifically to a new and useful system and method for stationary vehicle stabilization.

BACKGROUND

Many vehicle stabilizers deploy by jacking the vehicle frame upward, thereby transferring vehicle weight from the suspension and wheels onto the stabilizers. However, such jacking stabilizers require significant power to lift the vehicle, which may require heavy and/or expensive components. Furthermore, because the frame is lifted during stabilization, the stabilized vehicle frame will typically sit a significant height above the ground, increasing the difficulty of ingress and egress. Thus, there is a need in the vehicle stabilization field to create a new and useful system and method for stationary vehicle stabilization.

BRIEF DESCRIPTION OF THE FIGURES

FIGS. 4A-4C are partial side views of the embodiment in different suspension heights;

FIGS. 10A-10C are perspective views of an example distribution of the components of the embodiment;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
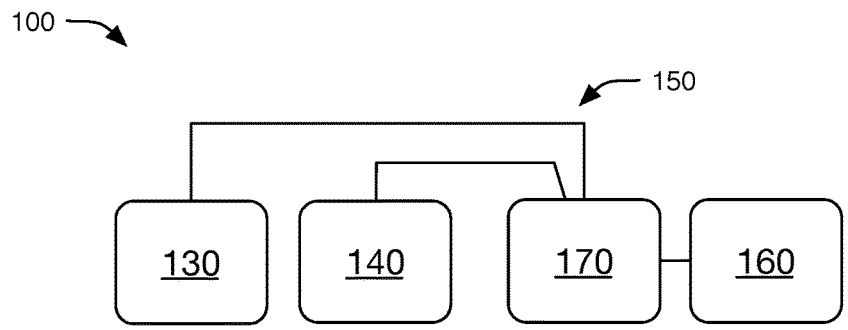
FIGS. 1A and 1B are schematic representations of variations of the system.
Figure 1B:
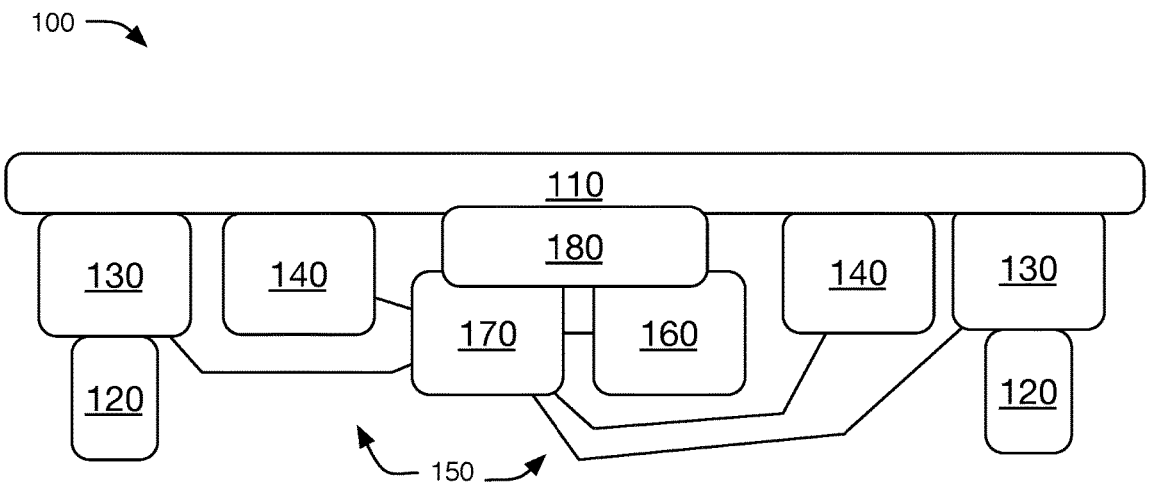

As shown in FIG. 1A, a vehicle stabilization system 100 can include: an active suspension module 130, a stabilizer 140, a fluid manifold 150, a fluid source 160, and a fluid controller 170. The system 100 can be integratable with, integrated with, and/or include a vehicle. Accordingly, the system can include or be configured to integrate with a vehicle frame 110, wheel 120, and mounting mechanism 180, as shown in FIG. 1B. As described in more detail below, one or more variations of the system 100 and/or vehicle can omit one or more of the above elements, as well as provide a plurality of one or more of the above elements, in providing a suitable vehicle stabilization system 100. However, the vehicle and/or stabilization system 100 can include any other suitable component.

The system 100 functions to stabilize the vehicle by supporting the vehicle against a support surface 2 (e.g., ground, road surface, etc.). The vehicle is preferably rigidly supported (e.g., by one or more rigid stabilizers 140) against the support surface 2 while the vehicle is not being driven. The vehicle can be a recreational vehicle or trailer (e.g., stabilized during use as a dwelling), semi-trailer (e.g., stabilized when not being towed, such as during loading and/or unloading), an emergency vehicle (e.g., fire truck stabilized during firefighting activity), construction vehicle (e.g., crane, backhoe, etc.), and/or any other suitable vehicle.

1.1 Frame

Figure 2A:
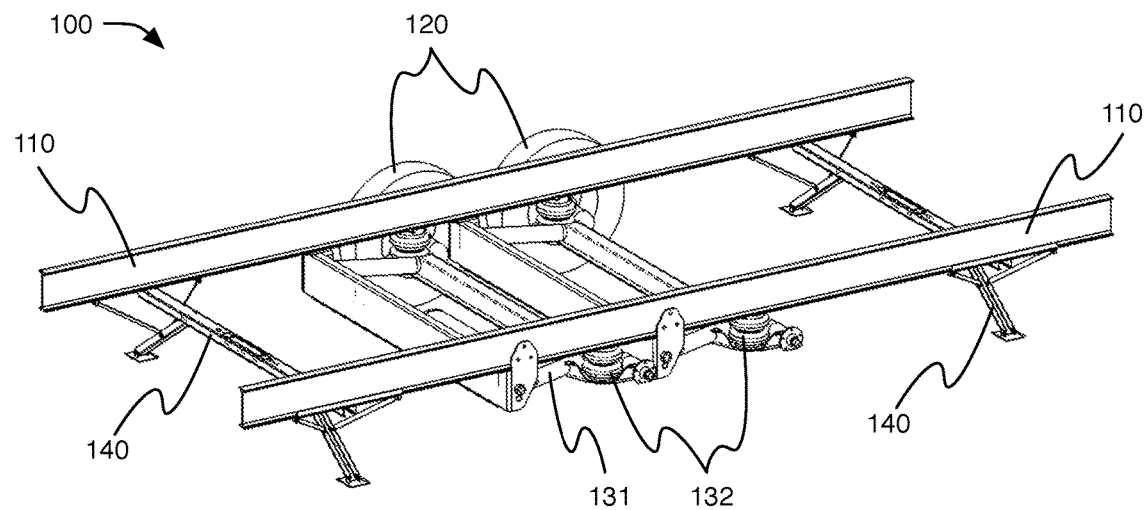
FIGS. 2A and 2B are perspective views of an embodiment of the system.
Figure 2B:
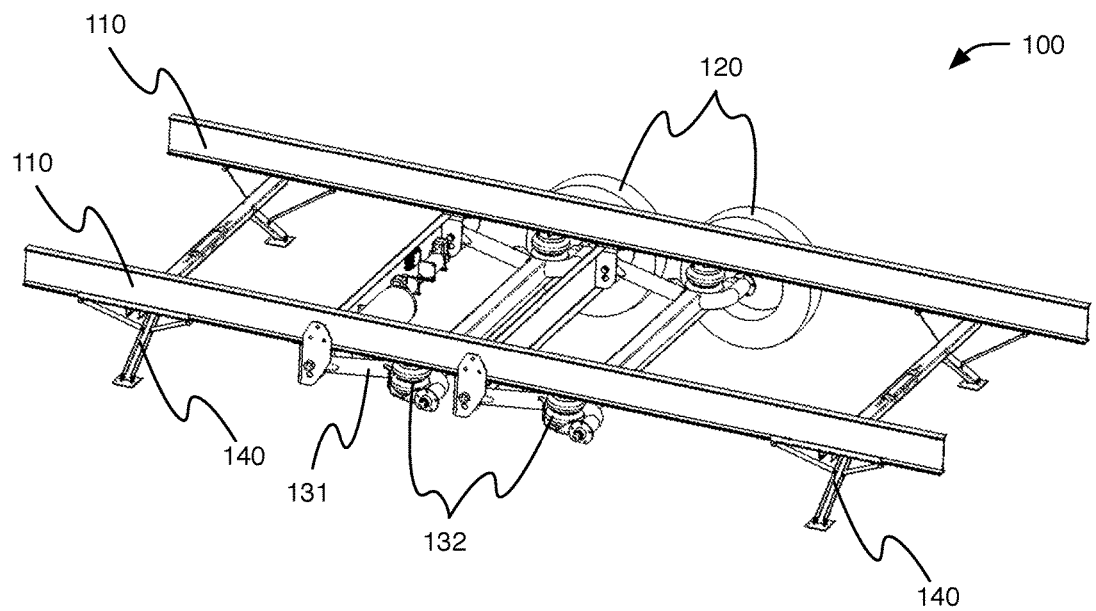

The vehicle preferably includes a frame 110, which functions as a supporting structure for the vehicle. The other vehicle components and/or system components are preferably mechanically coupled to the frame 110 (e.g., directly connected to the frame 110, coupled to the frame 110 by other components, etc.; as shown in FIGS. 2A-2B). However, the system components can additionally or alternatively be mounted to vehicle axles, bodies, or any other suitable mounting surface and/or mating element.

1.2 Wheel

The vehicle preferably includes one or more wheels 120, which can function to couple the vehicle to a support surface 2 (e.g., during unstabilized operation, such as driving or unstabilized parking). Each wheel 120 preferably defines a central axis (e.g., along a cylinder axis of the wheel) about which the wheel is configured to rotate during operation. The wheel 120 can include a tire, rim, and/or any other suitable wheel components.

The wheels 120 are preferably arranged in pairs, with the two wheels of each pair arranged opposing one another (e.g., substantially coaxially along their respective central axes) across a vertical longitudinal midplane of the vehicle. The wheels 120 can additionally or alternatively be arranged along one or more lines or in a tricycle configuration. In specific examples, the vehicle includes four wheels arranged in two pairs, each pair opposing the other across a lateral midplane of the vehicle; six wheels arranged in three pairs, all three pairs arranged on the same side of the lateral midplane; two wheels arranged in a single pair; or a single wheel (e.g., arranged along the vertical longitudinal midplane). However, the vehicle can include any suitable number of wheels in any suitable arrangement.

1.3 Active Suspension Module

Figure 3A:
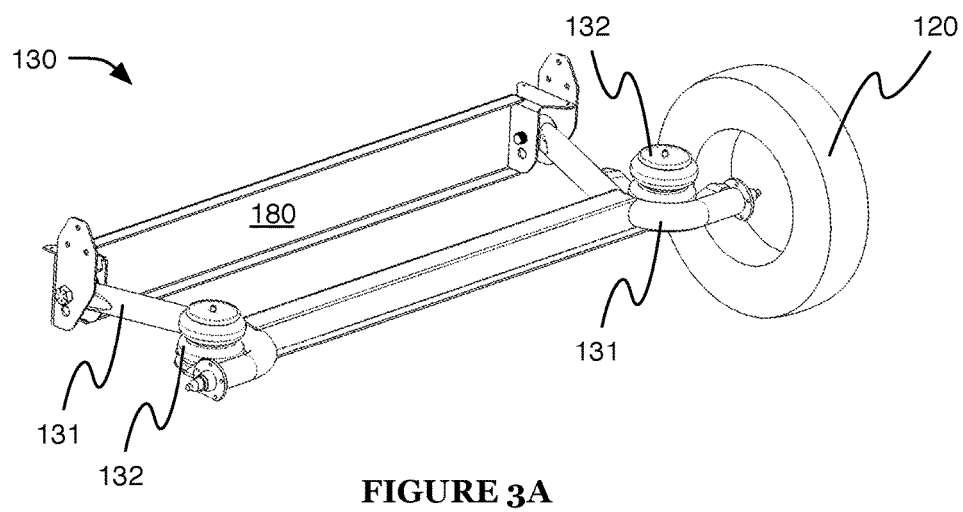
FIGS. 3A and 3B are a perspective view and a partial perspective view of the active suspension module of the embodiment, respectively.
Figure 3B:
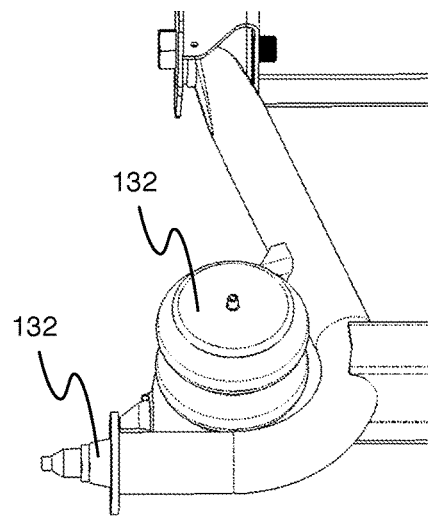
Figure 5A:
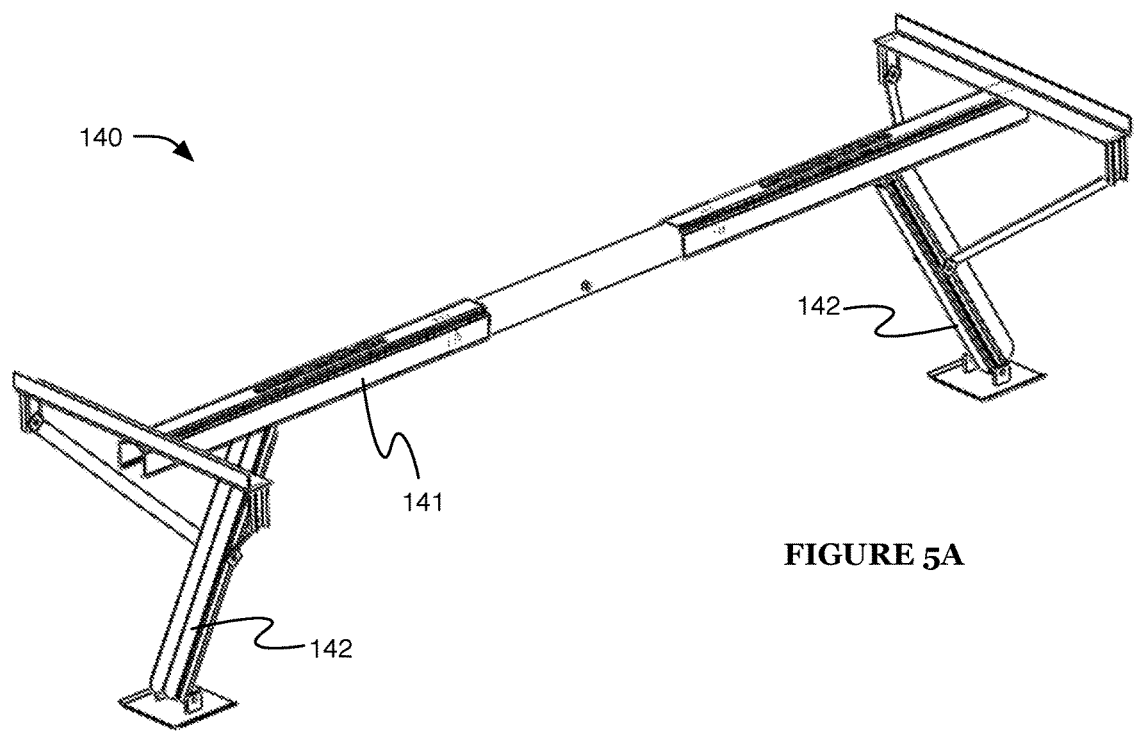
FIGS. 5A and 5B are perspective views of the stabilizer of the embodiment in the extended and retracted configuration, respectively.
Figure 5B:
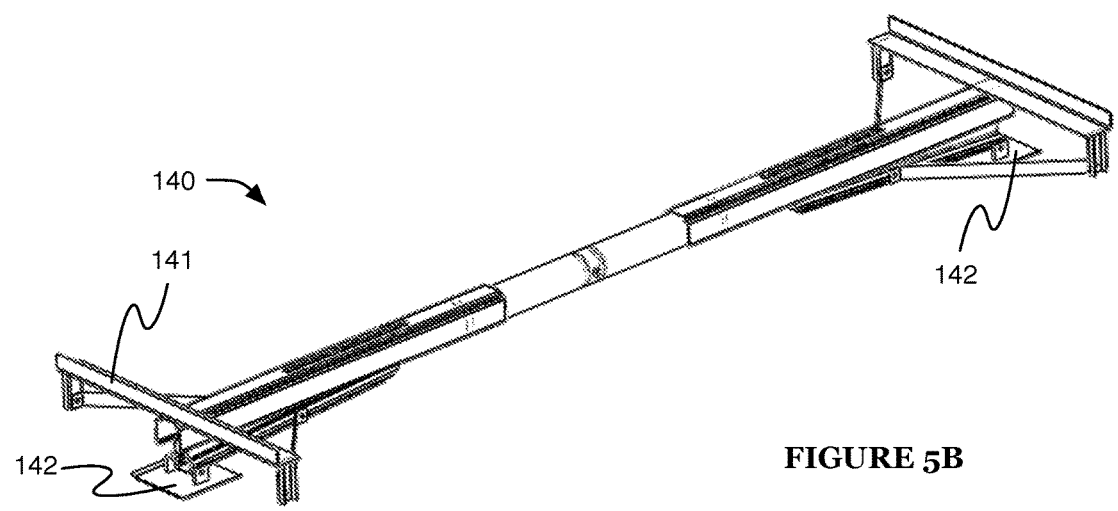
Figure 6A:
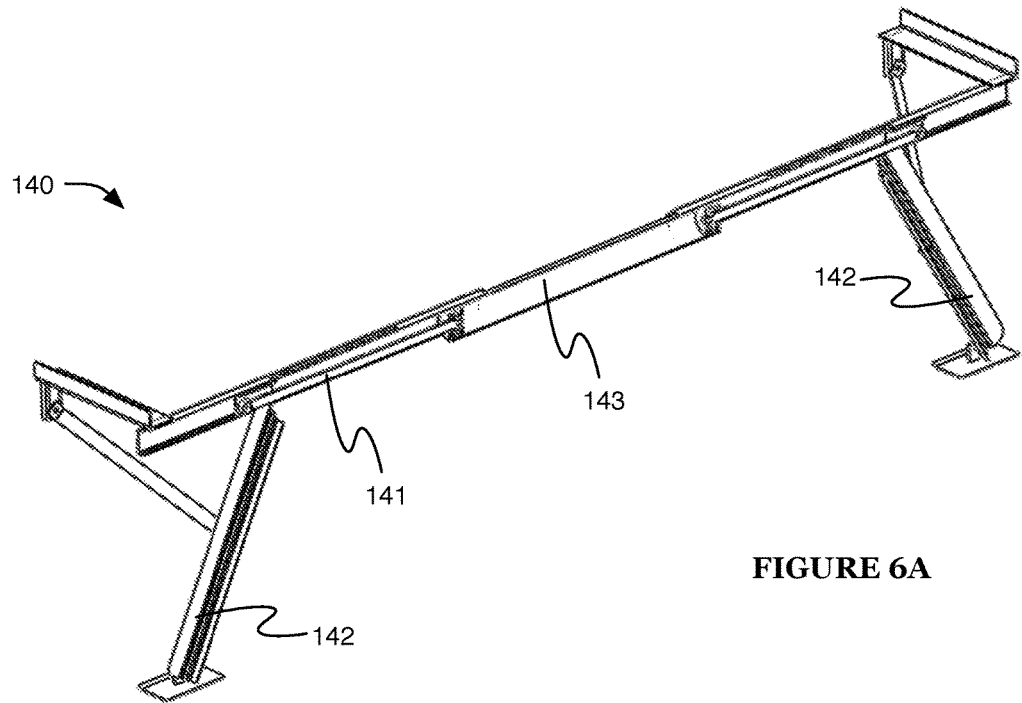
FIGS. 6A and 6B are cross-sectional views of FIGS. 5A and 5B, respectively.
Figure 6B:
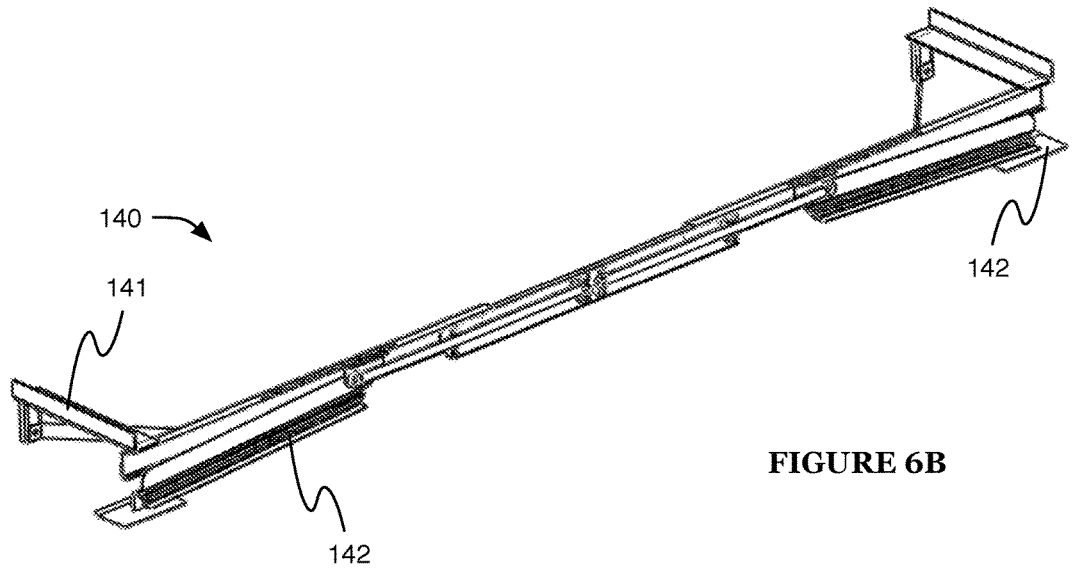

The active suspension module 130 functions to connect the frame 110 to the wheel(s) 120 and to enable active control of this connection. In one variation, the active suspension module 130 includes a twist-beam axle (e.g., as shown in FIGS. 3A-3B). However, the active suspension module 130 can include dependent suspension (e.g., a beam, a live axle, etc.), independent suspension (e.g., sway bars, swing axle, multi-link suspension, semi-trailing arm suspension, swinging arm suspension, leaf spring suspension, etc.), other semi-dependent suspension, tilting suspension system (e.g., with a tilting or leaning mechanism connecting the suspension to the frame or chassis), or any other suitable suspension. The active suspension module 130 can include one or more control arms 131 (e.g., trailing control arms; preferably one for each wheel 120) and/or active suspension mechanisms (e.g., preferably one for each wheel 120 or each control arm 131).

The control arm 131 can include a first and second member. The first member is preferably connected (or otherwise mechanically coupled) to the frame no. In some variations, this connection is farther from the wheel 120 (e.g., the wheel connected to the control arm 131) than would be typical for an alternate suspension type, such as a leaf spring suspension. The second member is preferably rotatably connected to the wheel 120 (e.g., about the wheel central axis) and to the first member. The second member is preferably arranged below the frame no, and preferably includes an upper side (e.g., proximal the frame) and a lower side (e.g., distal the frame). However, the control arm 131 can be otherwise configured.

The active suspension mechanism functions to dynamically adjust the distance between the frame and the wheel (e.g., wheel rotational axis) during vehicle operation (e.g., function as the vehicle suspension as the vehicle is driving). The active suspension mechanism can additionally or alternatively function to control the vehicle stabilization system height and/or operation mode. The active suspension mechanism preferably includes a fluid spring, more preferably a pneumatic spring 132 (e.g., air spring, compressible liquid spring, etc.), but can additionally or alternatively include a hydraulic mechanism, electromagnetic mechanism, and/or any other suitable active suspension mechanism. The pneumatic spring 132 can be a bag, cylinder, bellows, or similar structure that can expand (lengthen between a first and second spring end, stiffen, harden) or contract (shorten between the first and second spring end, soften, flex) when fluid (e.g., air) is either introduced to (e.g., pumped into) or removed from (e.g., pumped out, allowed to vent to an outlet or ambient environment, etc.) a spring interior defined by the pneumatic spring 132, respectively. However, the pneumatic spring can be a piston or have any other suitable configuration.

The first spring end can be connected (or otherwise mechanically coupled) to the frame 110. The second spring end can be connected (or otherwise mechanically coupled) to the control arm 131, preferably below the upper side of the control arm (e.g., alongside a major body of the control arm, as shown in FIG. 3A), such as to the body of the control arm, to the lower side of the control arm, to a component below the control arm, or to any other suitable mounting point. However, the second spring end can be connected to the upper side of the control arm or to any other suitable mounting point. The spring 132 can be arranged alongside, on top of, below, through the control arm, or be otherwise arranged. In a specific example, the second spring end can be supported by a portion of the lower side of the control arm extending out from the control arm major body, such that the second spring end is at substantially the same height as the control arm lower side (e.g., as shown in FIG. 4A). This arrangement can function to reduce the minimum distance (e.g., achieved when the spring is minimally inflated, as shown in FIG. 4B) between the wheel 120 and frame 110, while still enabling significant extension of the wheel away from the frame (e.g., achieved when the spring is maximally inflated, as shown in FIG. 4C).

The active suspension module 130 can additionally include one or more sensors. The sensors can include position sensors (e.g. optical encoders, Hall effect sensors, etc.; configured to sense control arm angle, distance between the wheel and the frame, pneumatic spring length, etc.), force sensors (e.g., configured to sense pneumatic spring pressure, tire pressure, component load, etc.), temperature sensors, and/or any other suitable sensors.

Figure 11A:
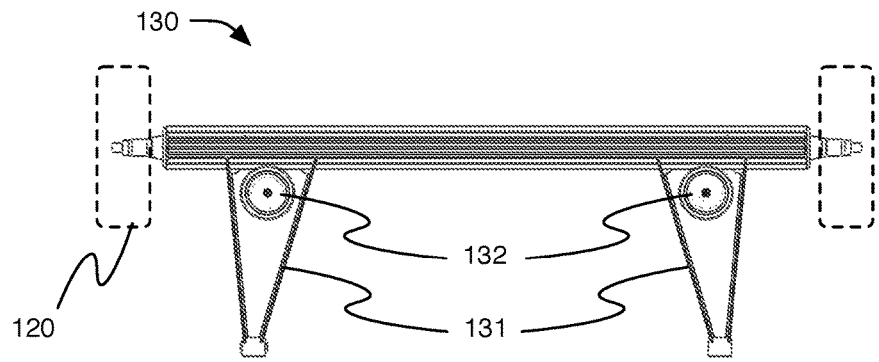
FIGS. 11A-11C are top views of examples of a second variation of an active suspension module of the system, configured for various frame and track widths.
Figure 11B:
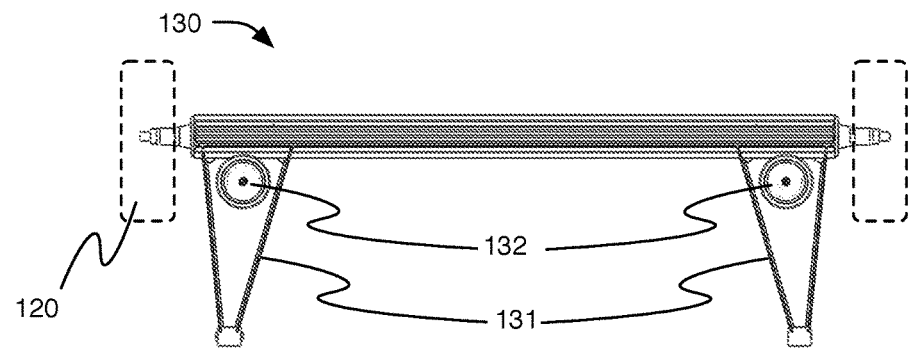
Figure 11C:
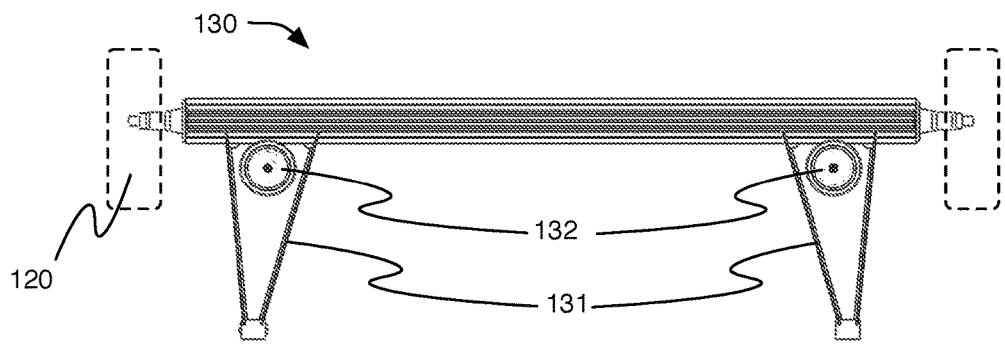

The active suspension module 130 can be adjusted to accommodate different vehicle frame widths and/or track widths (e.g., as shown in FIGS. 11A-C). For example, the cross-beam can be configured to mount the control arms at various positions on the cross-beam (e.g., discrete positions, arbitrary positions along the length of the cross-beam, etc.), allowing the control arms to be mounted to accommodate the desired frame width. Further, in this example, the control arms can be mounted to various cross-beams of different lengths, allowing an appropriate cross-beam to be selected for the desired track width. Alternatively, the cross-beam can have an adjustable length (e.g., include a telescoping mechanism, etc.), be otherwise adjustable, have a fixed length, or have any other suitable length. The active suspension module 130 can additionally or alternatively include any other suitable components.

1.4 Stabilizer

The stabilizer 140 or stabilizers function to stabilize the vehicle by rigidly supporting the vehicle on a support surface 2. Each stabilizer 140 is mechanically coupled to the frame 110 and operable to mechanically couple to the support surface 2. The stabilizer 140 preferably includes a deployment mechanism, locking mechanism 144, and retraction mechanism 145, but can additionally or alternatively include any other suitable component. In one embodiment, the stabilizer 140 includes a mount 141 connected (preferably rigidly, alternatively removably, actuatably, or otherwise connected) to the frame no, and a leg 142 mechanically coupled (e.g., connected) to the mount 141. The mount 141 can be connected to one or more legs 142 (e.g., two legs). Each leg 142 can have a first and second leg end, wherein the leg is connected to the mount 141 proximal the first leg end (e.g., at the first leg end), and the second leg end is operable to contact the support surface 2 (e.g., the ground). However, the leg 142 can be otherwise connected to the mount 141.

The stabilizer 140 is preferably operable between a retracted configuration (e.g., wherein the stabilizer 140 does not contact the support surface 2) and one or more deployed (e.g., extended) configurations (e.g., wherein the stabilizer 140 extends toward and/or contacts the support surface 2). For example, the leg 142 can be operable between the retracted configuration (e.g., wherein the second leg end is in a retracted position) and the one or more extended configurations (e.g., wherein the second leg end is in an extended position, such as a position distal the mount relative to the retracted position); examples shown in FIGS. 5A-5B and 6A-6B. Preferably, the stabilizer 140 (e.g., leg 142) is operable along a continuous or pseudo-continuous range of extended positions (e.g., wherein the extension distance can be varied continuously), but can alternatively be operable in a single extended position, in a range of discrete extended positions (e.g., defined by the teeth of a ratcheted system), or operable between any other suitable set of positions.

Figure 8A:
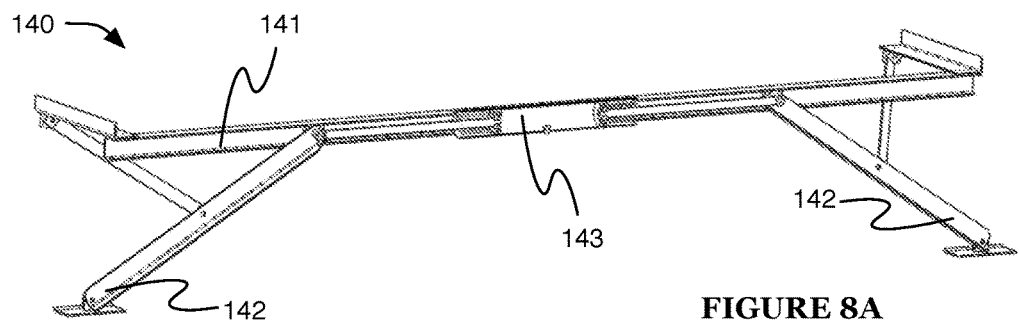
FIG. 8A is a cross-sectional perspective view of the stabilizer of the embodiment in an extended configuration.
Figure 8B:
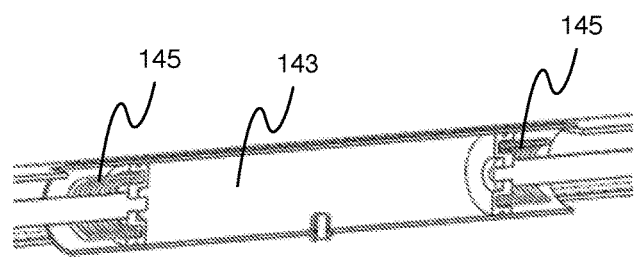
FIGS. 8B and 8C are partial cross-sectional perspective views of the stabilizer of the embodiment in the extended and retracted configuration, respectively.
Figure 8C:
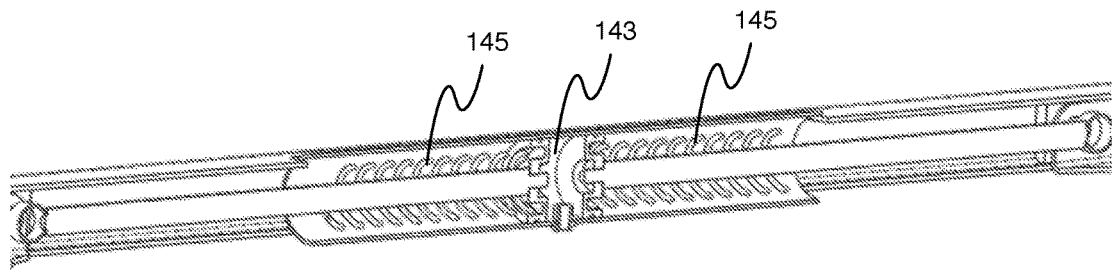

The deployment mechanism functions to deploy the stabilizer (e.g., places the stabilizer toward the extended configuration). The deployment mechanism is preferably an automatic deployment mechanism, and is preferably passive but can alternatively be active. The automatic deployment mechanism can be pneumatic, hydraulic, and/or motorized (e.g., driven by motor power transmitted through a mechanical linkage); can be operable to release a latch or other lock, thereby allowing passive extension (e.g., due to a gravitational force; due to a magnetic and/or spring force generated by a magnet or spring attached to the leg and biasing the leg toward the extended position; etc.); or can include any other suitable automatic deployment mechanism. For example, the stabilizer 140 can define a chamber 143 (e.g., piston chamber, such as shown in FIGS. 8A-8C), wherein second leg end extends into an extended position in response to application of a pneumatic force on the chamber 143 (e.g., introduction of compressed air to the chamber). The deployment mechanism can additionally or alternatively include a manual deployment mechanism (e.g., wherein a user can manually extend the leg 142 into an extended configuration) and/or any other suitable deployment mechanism. The deployment mechanism can function to deploy multiple stabilizers and/or stabilizer legs (e.g., a piston with two piston rods, each connected to a leg, such as shown in FIG. 8A), or only deploy a single stabilizer element (e.g. stabilizer leg).

In a first variation, the deployment mechanism is not capable of jacking up the vehicle (and/or can be controlled to not jack up the vehicle during extension). This variation can enable the use of a lower-power deployment mechanism (as compared with a jack). In addition, this variation can enable facile deployment of the stabilizer 140 to stabilize the vehicle in the position (e.g., frame position and orientation relative to the support surface 2, a gravity vector, etc.) that the vehicle occupies before stabilizer deployment (e.g., rather than substantially altering the vehicle position during deployment). For example, during extension of a leg 142, the second leg end will extend against minimal resistance through the air, but after contacting the support surface 2, resistance to additional extension will increase significantly, beyond the power supplied by the deployment mechanism.

In a second variation, the deployment mechanism is capable of jacking up the vehicle (e.g., is a jack, is capable of lifting a load greater than a percentage of the gross vehicle weight, such as 100%, 50%, 25%, 10%, etc.). In a third variation, some of the stabilizers 140 of the system 100 cannot jack up the vehicle, whereas the remaining stabilizers 140 can. In a specific example, the vehicle is a semi-trailer that includes one or more jacks connected to the frame 110 on a first side (e.g., front side) of the lateral vehicle midplane and one or more non-jacking stabilizers 140 connected to the frame 110 opposing the jacks across the lateral midplane. However, the system 100 can include any suitable number of stabilizers 140 and/or jacks in any suitable arrangement.

Figure 7A:
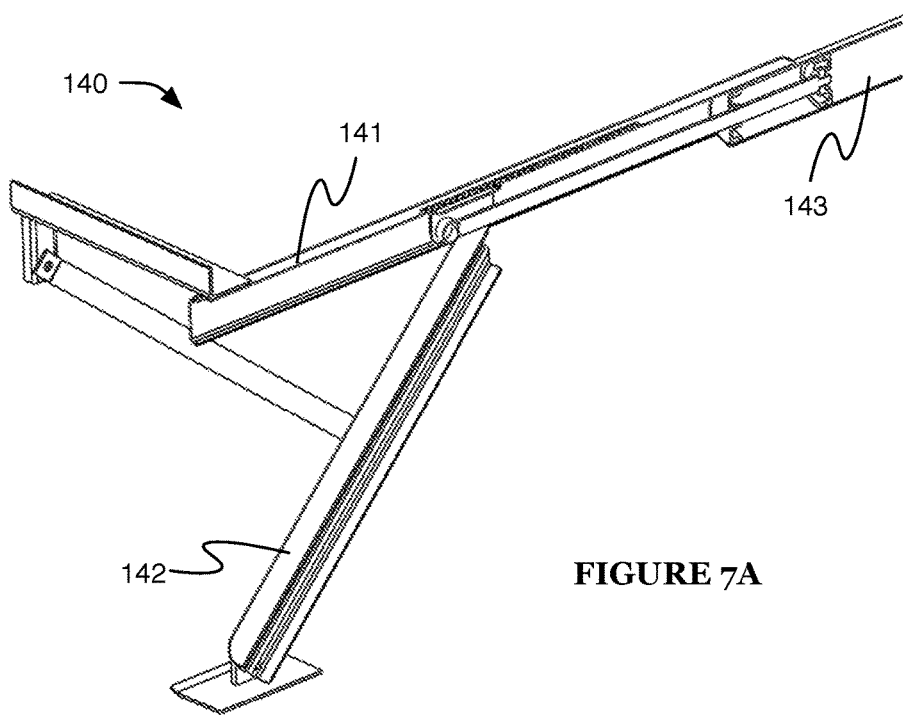
FIG. 7A is a partial cross-sectional view of the stabilizer of the embodiment in a second extended configuration.
Figure 7B:
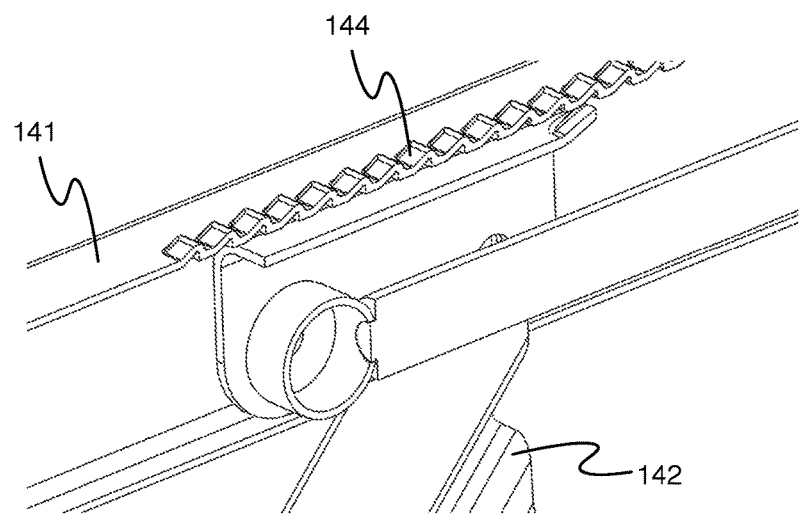
FIG. 7B is a partial view of FIG. 7A.

The locking mechanism 144 functions to lock the stabilizer 140 into one or more deployed configurations. The locking mechanism 144 can enable the stabilizer 140 to support a significant compressive load (e.g., a percentage of the gross vehicle weight, such as 100%, 50%, 25%, 10%, etc.) while locked in the deployed configuration (and enable a set of stabilizers 140, such as the set of all deployed stabilizers 140, to cooperatively support the entire gross vehicle weight). The locking mechanism 144 is preferably a passive locking mechanism (e.g., ratchet, latch). In one variation, the passive locking mechanism automatically locks when the stabilizer 140 is under a compressive load greater than a threshold load (e.g., a percentage of the gross vehicle weight) and automatically unlocks when the load is removed or reduced (e.g., below the threshold, below a second threshold). For example, the leg can be connected to a piston rod of the mount 141, and the piston rod can include a pawl that locks against a rack of the mount 141 when the leg is under a compressive load (e.g., as shown in FIGS. 7B-7C). In a second variation, the passive locking mechanism automatically locks when the stabilizer 140 is deployed, and must be unlocked (e.g., by an active unlocking mechanism, by the retraction mechanism 145, manually, etc.) to enable stabilizer retraction. The locking mechanism 144 can alternatively be an active locking mechanism, such as a motorized latch, a manually insertable and removable pin, the deployment mechanism (e.g., the motor of the deployment mechanism), or be any other suitable active locking mechanism.

The retraction mechanism 145 functions to retract the stabilizer 140 into the retracted configuration. The retraction mechanism 145 is preferably a passive retraction mechanism, such as a spring or set of magnets biasing the stabilizer 140 toward the retracted configuration (e.g., biasing the leg toward the retracted position). Preferably, the passive retraction mechanism automatically retracts the stabilizer 140 when the locking mechanism 144 is not locked and the deployment mechanism is not active. For example, the passive retraction mechanism can exert sufficient force to retract the stabilizer 140, but not to overcome the deployment mechanism or locking mechanism 144. In a specific example, the passive retraction mechanism includes a set of springs that are compressed when the deployment mechanism (e.g., piston within the stabilizer housing) is actuated (e.g., wherein a spring end can be connected to the piston) and the legs locked into an extended position (e.g., wherein a pawl of the leg is forced against a rack of the frame or control arm by the vehicle weight). The compressed spring force is preferably lower than the force required to retract the legs against the locking force exerted by the vehicle weight, but high enough to retract the legs when the vehicle weight is removed. However the retraction mechanism can be otherwise configured. The retraction mechanism 145 can additionally or alternatively include an active retraction mechanism (e.g., pneumatic, hydraulic, motorized, manual, etc.) and/or any other suitable retraction mechanism.

The stabilizer 140 can optionally include one or more sensors, such as position sensors (e.g., configured to detect whether the stabilizer 140 is deployed, configured to detect an amount or range of stabilizer extension, etc.), lock sensors (e.g., configured to detect locking mechanism status), load sensors (e.g., configured to measure a load applied to the stabilizer 140), and/or any other suitable sensors. The sensors can be used to determine whether a desired stabilizer state has been achieved, monitor for leaks or other maintenance events, or otherwise used. However, the stabilizer 140 can additionally or alternatively include any other suitable components.

1.5 Fluid Manifold

Figure 9A:
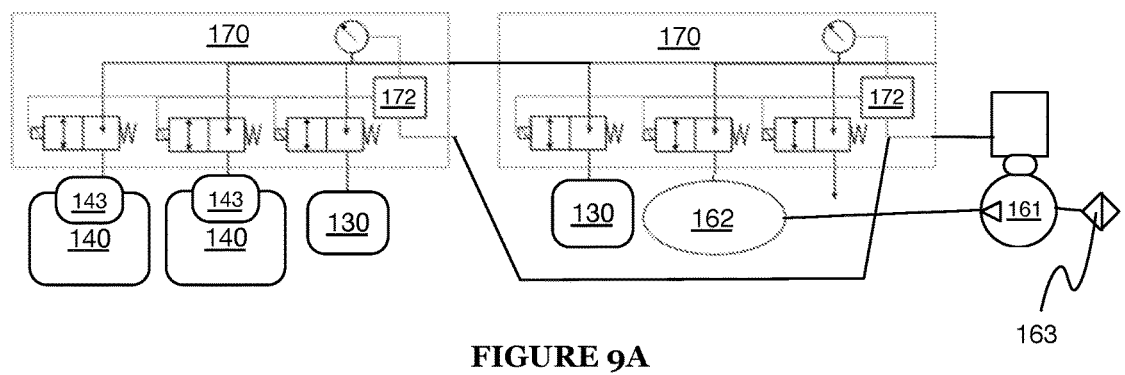
FIGS. 9A and 9B are schematic representations of a first and second variation, respectively, of pneumatic components of the system.
Figure 9B:
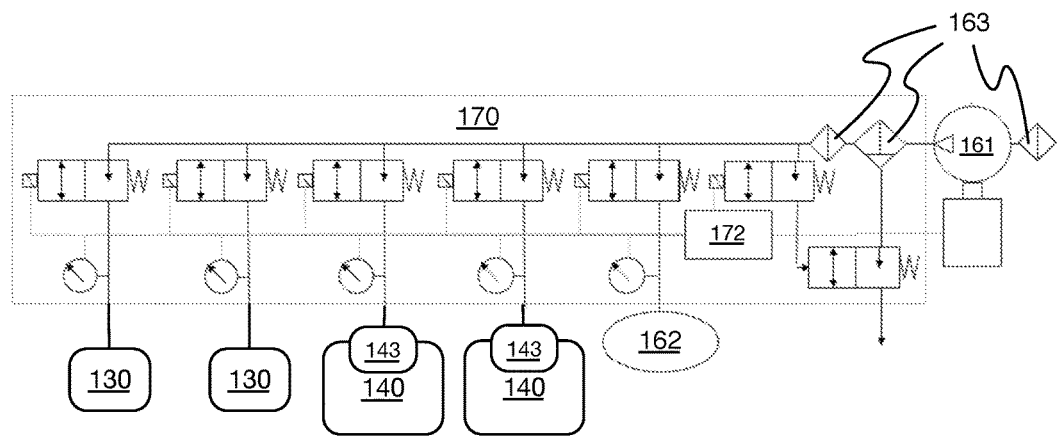

The fluid manifold 150 functions to deliver fluid (e.g., compressed air) to the pneumatically-actuated components of the system 100. The fluid manifold 150 preferably connects to the pneumatic spring(s) 132, stabilizer(s) 140, and/or fluid source(s) 160, enabling the spring interior and/or stabilizer chamber 143 to be fluidly coupled to the fluid source output (e.g., as shown in FIGS. 9A-9B). However, the fluid manifold 150 can connect any other suitable set of components. The components are preferably fluidly coupled via the control manifold 171. The fluid manifold 150 can be a manifold or set of manifolds, a tube, or several independent tubes (e.g., cooperatively forming a manifold with the control manifold 171).

1.6 Fluid Source

The fluid source 160 functions as a source of fluid. The fluid can be pneumatic fluid (e.g., gas such as air, compressible liquid, etc.), hydraulic fluid, incompressible liquid, and/or any other suitable fluid. The fluid source 160 can include one or more compressors 161, reservoirs 162, filters 163, and/or any other suitable components. Additionally or alternatively, the fluid source 160 can be a tank of fluid, the ambient environment, or be any other suitable source. The compressor 161 (e.g., air compressor) can have an inlet through which fluid (e.g., uncompressed air) can enter and an outlet through which the compressed fluid can exit. The reservoir 162 (e.g., tank, pressure vessel, tube, etc.) can define a reservoir interior, can retain fluid (e.g., compressed air; received from the compressor outlet) within the reservoir interior, and can release the fluid from the reservoir interior to function as a fluid source.

A filter 163 can be of the type and/or arrangement described in U.S. application Ser. No. 14/971,520, the entirety of which is incorporated by this reference (e.g., an integrated, coalescing, self-purging filter fluidly connected to the channel), and/or can be any suitable filter in any suitable arrangement. Each filter 163 can be arranged at, connected to, and/or fluidly coupled to the inlet and/or outlet of the compressor 161, reservoir 162, and/or any other suitable pneumatic component(s) of the system 100. However, the system 100 can include any suitable fluid source(s) in any suitable arrangement.

1.7 Fluid Controller

Figure 12A:
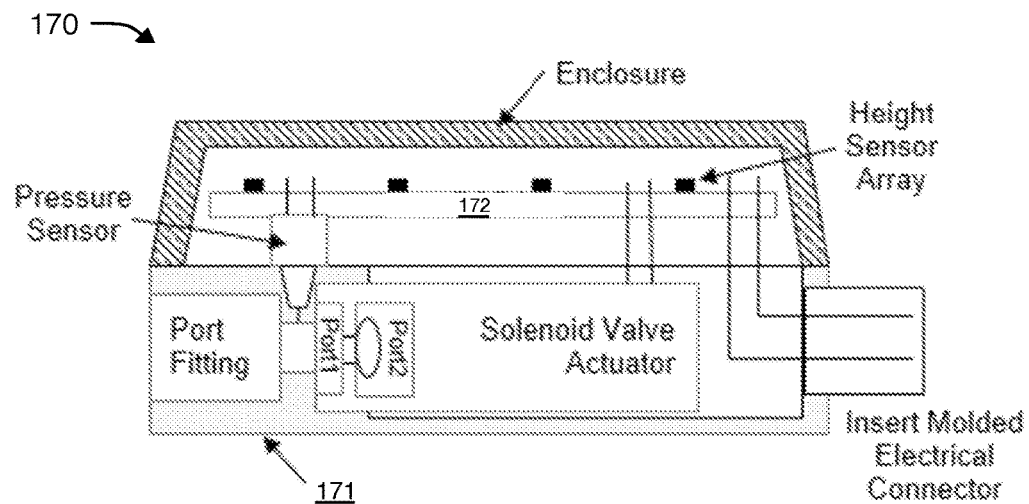
FIGS. 12A-12B are a schematic representation and a perspective view of an embodiment of the fluid controller.
Figure 12B:
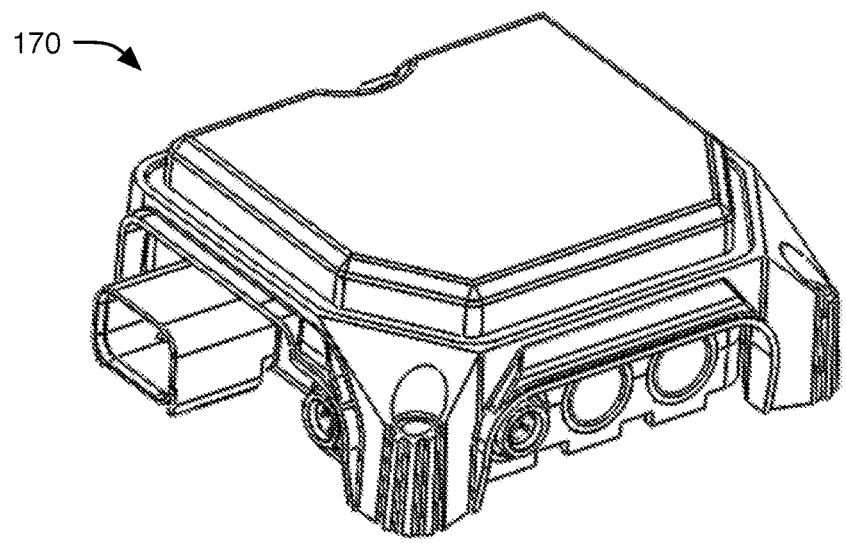

The fluid controller 170 functions to control the flow of fluid through the system 100. The fluid controller 170 can include a control manifold 171, electronic controller 172, and/or sensors (e.g., as described in U.S. application Ser. No. 14/971,520, the entirety of which is incorporated by this reference; example shown in FIGS. 12A-12B), and/or can be any other suitable fluid controller.

The system 100 can include a single fluid controller 170, or include multiple fluid controllers 170 (e.g., each controlling a portion of fluid control points throughout the system 100). The multiple fluid controllers 170 can communicate electronically (e.g., via the vehicle CAN bus, via other wiring, wirelessly, etc.), mechanically, fluidically, or in any other suitable manner, or can alternatively not communicate (e.g., operate entirely independently).

The control manifold 171 preferably includes one or more ports. The port functions to fluidly connect a single attached service to the control manifold 171. The port can also function to receive an external fitting (e.g., a threaded quick-release compressed-gas fitting) that facilitates fluid connection of the port to an attached service. The port can additionally function to fluidly connect a system inlet (e.g., the filter) to the service, a second service to the service, or provide any other suitable fluid connection between a first and second endpoint. The port preferably defines an open first end, open second end, and a flow axis extending between the first and second ends. However, the first end and/or second end can be closed or otherwise configured. The port preferably defines a straight flow axis, but can alternatively define a curved flow path, a branched flow path (e.g., with at least a third end in addition to the first and second end), or any other suitable path along which air can flow through the port. In variations including a plurality of ports, the flow axis of each port is preferably parallel to each of the other flow axes of each of the other ports. In one example, the first and second ports are arranged with the respective flow axes sharing a common plane (port plane). However, multiple ports can be arranged offset from each other, at a non-zero angle to each other, or be arranged in any other suitable configuration.

The control manifold 171 preferably includes one or more pressure sensor ports, which function to receive one or more pressure sensors. The pressure sensor ports can additionally function to fluidly connect the pressure sensors with at least one of the ports and/or the channel. The pressure sensor port can be fluidly connected to the first port, second port, channel, or to any other suitable lumen by a fluid connection defined through the manifold thickness, wherein the fluid connection can be selectively formed after manifold manufacture (e.g., by a vertical drilling operation to remove the interposing manifold thickness), formed during manifold manufacture (e.g., with an injection molding insert), or otherwise formed at any other suitable time. The remaining manifold thickness preferably separates (e.g., fluidly isolates) the pressure sensor port from the other lumens. In some variations, the pressure sensor port can only be simultaneously fluidly connected to one of the ports or the channel. Alternatively, the pressure sensor port can be simultaneously fluidly connected to multiple of the ports and/or channel. However, the pressure sensor port can otherwise selectively permit pressure sensor access to one or more of the ports or channel.

In one example, the pressure sensor port is arranged between an adjacent first and second port, proximal the respective second ends. The pressure sensor port overlaps a region encompassing a portion of the first port, second port, and the channel. This configuration can enable the same control manifold 171 to be reconfigurable for various desired pressure sensing configurations depending on user or system requirements, and foregoes the need for complex porting between the pressure sensor ports and the pressurized region of interest. However, the pressure sensor port can be arranged in any other suitable location.

The control manifold 171 preferably includes a channel (galley), which functions to contain a reservoir of compressed air that is simultaneously accessible to each of the actuators. The channel preferably intersects the first and second ports between the respective first and second ends of each port, but can alternatively be connected by a secondary manifold or otherwise connected to one or more ports of the control manifold 171. The channel is preferably fluidly connected to every port of the control manifold 171, but can alternatively be connected to a first subset of ports and fluidly isolated from a second subset of ports. The channel preferably extends normal the port, but can alternatively extend parallel to or at any other suitable angle to the port. The channel preferably lies in the same plane as the ports, but can alternatively be offset from the port plane (e.g., lie above or below the port plane, extend at an angle to the port plane, etc.). The channel is preferably substantially linear (e.g., define a substantially linear flow axis), but can alternatively be curved (e.g., toward or away from the second end, out from the port plane, etc.) or have any other suitable configuration. However, the channel can be otherwise configured or arranged.

The control manifold 171 preferably includes a cavity, which functions to receive the actuator(s) and to coaxially align the actuator(s) with the port(s). The cavity is preferably contiguous with the ports, but can alternatively be otherwise related to the ports. In one example, the cavity intersects the second end of the ports.

The actuator of the system can include a barrel, a body, and a connector. The actuator functions to selectively bring the channel into fluid communication with the port to which the actuator is coupled. In one variation, the actuator is selectively operable between an open position, wherein the actuator permits fluid connection between the respective port and the channel, and a closed mode, wherein the actuator ceases (e.g., prevents) fluid flow between the respective port and the channel. Actuator operation can be actively controlled by the electronic controller, passively controlled, or otherwise controlled by any other suitable control system. The actuator is preferably at least partially housed by the manifold, but can alternatively be arranged external the manifold (e.g., in variants where the manifold only defines the ports and the pressure sensor ports), or be arranged in any other suitable location relative to the manifold.

The actuator can define an actuation axis, wherein the actuator can be arranged within the cavity such that the actuation axis is parallel (more preferably collinear or coaxial, but alternatively in any suitable configuration) with the flow axis of the first port. However, the actuator can be arranged with the actuation axis at any suitable angle to the flow axis of the port. The actuator is preferably configured to regulate the flow of a pressurized fluid between the channel and the first end of the first port, but can alternatively regulate pressurized fluid flow between a first and second port, or regulate pressurized fluid flow in any other suitable flow pattern.

The actuator is preferably a solenoid valve, examples of which include a two-way direct acting solenoid valve, a two-way pressure-balanced solenoid valve, and a three-way solenoid valve. The solenoid valve can have one of a set of orifice sizes (e.g., a 2 mm orifice, a 4 mm orifice, and a 0.5 mm orifice) that governs the maximum flow rate through the solenoid valve between the channel and the port during actuation, for a given pressure in the channel. The actuator can alternatively be any suitable linear or rotary actuator that enables electromechanical control of fluid communication between the channel and one or more of the ports. The actuator is preferably controlled by the electronics module using a pulse-width modulated (PWM) signal, but can alternatively be controlled using an analog signal, a digital signal, an amplified analog or digital signal, or any other suitable electronic control scheme.

In an example embodiment, the control manifold 171 defines a first, second, and third port, each port defining a flow axis extending between a first and second end of the port. Each port also defines a receiving region at the second end. Each of the flow axes are arranged in a common plane, with each of the flow axes parallel to one another. The control manifold 171 additionally defines a channel, intersecting the first, second, and third port between the first and second ends of each port. The control manifold 171 additionally defines a cavity, which intersects the second end of each port, forming a void intended to receive one or more actuators. The control manifold 171 additionally defines one or more pressure sensor ports, each positioned between two of the ports and defining a sensor insertion axis normal to the common plane. Each pressure sensor port is separated from the two respective ports and the channel by a thickness of the control manifold 171. The thickness can be specified by the mold from which the control manifold 171 is made by injection-molding. The thickness of the control manifold 171 can be removed (e.g., by drilling) between the pressure sensor port and any one of the two respective ports and the channel, in order to fluidly connect two of these regions. This fluid connection allows a pressure sensor, arranged in the pressure sensor port, to make a contact pressure measurement of the pressure in any one of the first port, the second port, and the channel. The control manifold 171 can additionally include one or more actuators, each arranged within the cavity with the actuation axis collinear the flow axis of a port and configured to regulate pressurized fluid flow between the channel and the first end of that port.

In one example, the control manifold 171 can be fluidly coupled to the spring interior at the first port, fluidly coupled to the chamber 143 at the second port, and fluidly coupled to the fluid source 160 at the third port (e.g., at the respective first end of each port), and so the control manifold 171 can regulate pressurized fluid flow between the fluid source 160 and each of the spring interior and the chamber 143 independently. In a second example, the control manifold 171 includes one or more ports that can be fluidly coupled to other pneumatic vehicle components, such as doors and/or slideouts, wherein the doors and/or slideouts can be controlled by actuators of the fluid controller. However, the control manifold 171 can have any other suitable set of elements in any other suitable configuration, and can be arranged in the system 100 in any other suitable way.

The fluid controller 170 can additionally or alternatively include one or more sensors (e.g., pressure sensors, actuator position sensors, etc.). The pressure sensor functions to measure a signal indicative of the air pressure in one of several portions of the control manifold 171 (e.g., in the pressure sensor port, the channel, the port, etc). The pressure sensor can also function to enable control of the actuator(s) based on pressures detected by the pressure sensor. The pressure sensor is preferably arranged in a pressure sensor port, wherein the pressure sensor port has preferably been "activated" (i.e., a fluid connection has been installed between one or more of the ports, the channel, and the pressure sensor port) prior to assembly of the pressure sensor in the pressure sensor port. One or more variations of the pressure sensor(s) can also omit one or more of the above elements, as well as provide a plurality of one or more of the above elements, in providing a suitable pressure sensor.

The electronic controller 172 functions to control the actuators, and can additionally function to receive and/or analyze data sampled by the fluid controller sensor(s) and/or any other suitable sensors of the system 100. The electronic controller 172 can control the actuators based on the sensor data, based on communication with another fluid controller 170, based on control instructions (e.g., received from an input of the vehicle, received from a user device, etc.), and/or based on any other suitable information. However, the electronic controller 172 can function in any other suitable way, and the fluid controller 170 can include any other suitable components.

1.8 Vehicle Mounting Mechanism

A vehicle mounting mechanism 180 functions to affix components of the system 100 to a vehicle. A vehicle mounting mechanism 180 can include one or more brackets, bolts, fasteners, straps, clips, or similar devices that couple the components to the vehicle (e.g., as described in U.S. application Ser. No. 14/971,520, the entirety of which is incorporated by this reference), and/or can be any other suitable mounting mechanism. The vehicle mounting mechanism 180 can additionally or alternatively include a set of mating surfaces, some of which are constituted by portions of the system 100 (e.g., a through-hole in the control manifold) and some of which are defined by portions of the vehicle (e.g., a bracket with a mating through-hole, to which the system 100 can be bolted, attached to a strut support of the vehicle). As a further alternative, the vehicle mounting mechanism 180 can include a receiving manifold connecting a preexisting vehicle fluid system and the system 100 (e.g., wherein one or more ports of the control manifold are connected to the receiving manifold). The receiving manifold preferably includes one or more tubes that are each coupleable to a corresponding port of the control manifold, each of the one or more tubes fluidly connected to a service requiring pressurized air. Alternatively, the receiving manifold can define any suitable directed flow pattern.

In one example (e.g., as shown in FIGS. 10A-10C), the vehicle mounting mechanism 180 is a bracket (e.g., connected to the first member of the control arm). In this example, system components (e.g., reservoir 162, compressor 161, control manifold 171, etc.) are mounted to the bracket. The bracket can additionally connect the control arms of a first and second opposing wheel. Alternatively, the vehicle mounting mechanism 180 can be any suitable mounting mechanism and can mount any suitable components to the vehicle.

1.9 Inputs

The system 100 can additionally or alternatively include one or more inputs, which can function to receive control instructions for system operation. In a first variation, the system includes one or more manual inputs (e.g., buttons, switches, dials, etc.) that can be manually actuated by a user. The manual inputs can be within the vehicle (e.g., on the vehicle dashboard, adjacent a driver or passenger seat, etc.), outside the vehicle (e.g., mounted to the vehicle exterior), or in any other suitable location. In a second variation, the system includes a communication module operable to receive control instructions (e.g., from a user device, from a remote server, etc.). The communication module can be wired, wireless (e.g., using WiFi, Bluetooth, etc.), or any other suitable communication module. However, the system 100 can additionally or alternatively include any other suitable inputs and/or other components.

2. Method

Figure 13:
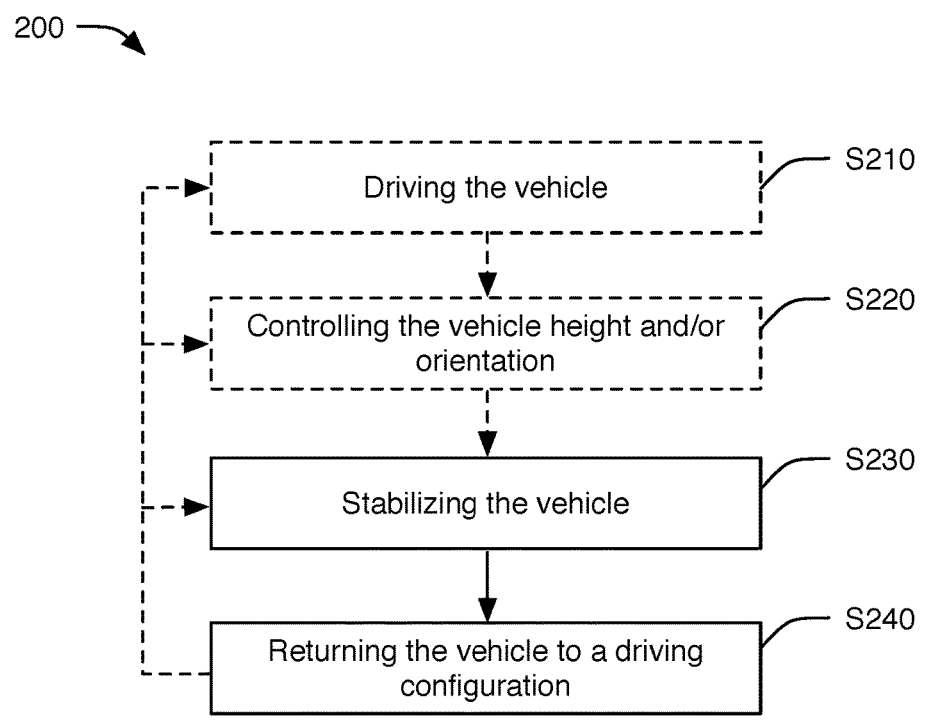
FIG. 13 is a schematic representation of the method.
Figure 14:
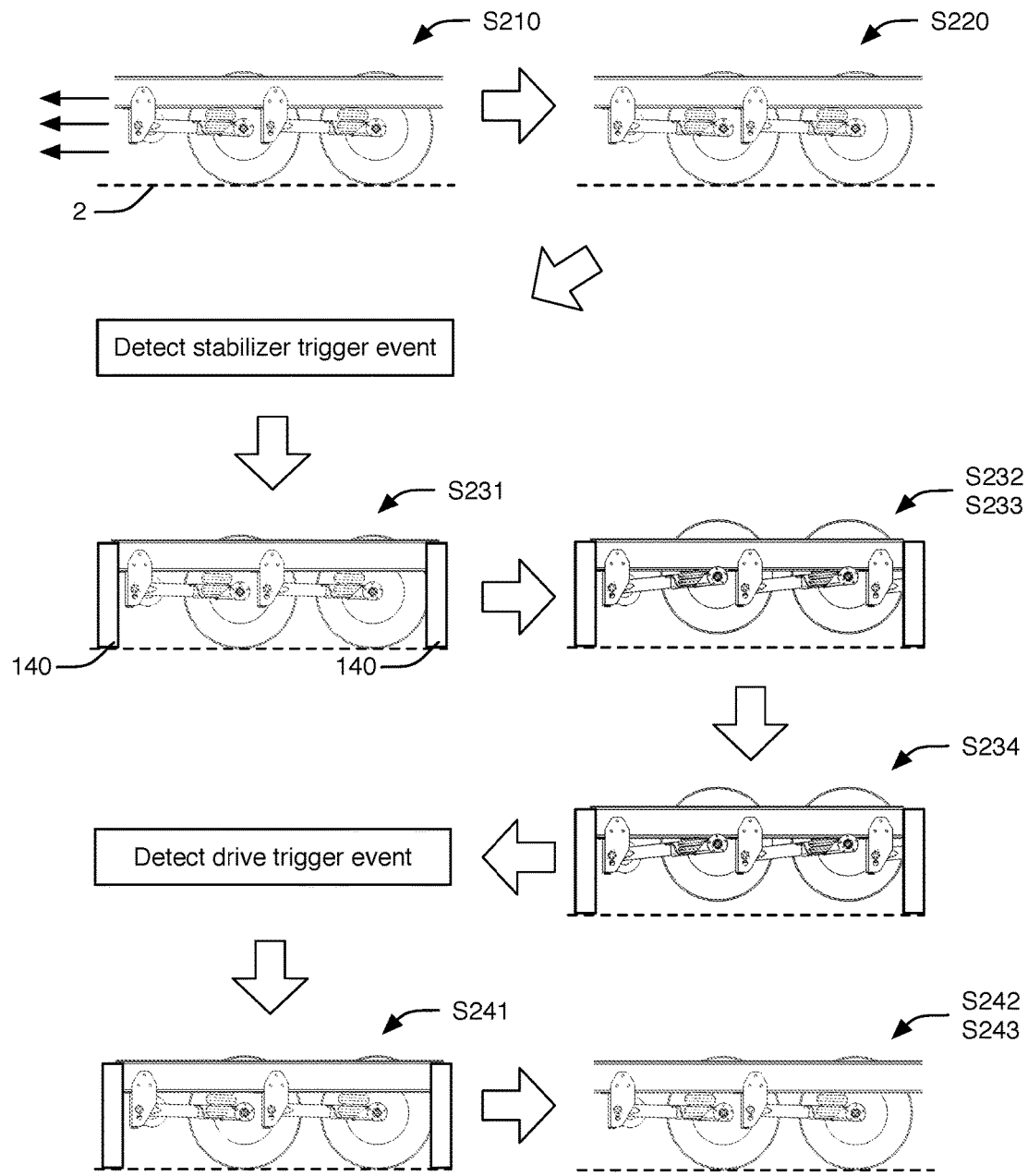
FIG. 14 is an example of the method.

A method 200 for vehicle stabilization includes stabilizing a vehicle S230 and returning the vehicle to a driving configuration S240, and can optionally include driving the vehicle S210 and/or controlling vehicle height and orientation S220 (e.g., as shown in FIGS. 13-14). The method 200 can be performed using the system 100 described above and/or any other suitable system.

2.1 Driving the Vehicle

Driving the vehicle S210 is preferably performed while the vehicle is in a driving configuration (e.g., vehicle wheels in contact with a support surface and cooperatively supporting substantially the entire weight of the vehicle, vehicle stabilizers retracted and not supporting the vehicle, etc.). S210 can include actuating an active suspension of the vehicle and/or the active suspension module of the vehicle stabilization system while driving (e.g., to control ride height, vehicle roll, etc.), which can function to enhance driving performance and/or passenger comfort.

2.2 Controlling Vehicle Height and Orientation

Controlling the vehicle height and orientation S220 functions to prepare the vehicle for stabilization (e.g., by achieving and maintaining a desired vehicle frame height and orientation).

S220 is preferably performed when the vehicle is stationary. S220 can be performed at all times, at all times that the vehicle is powered on, or in response to detection of a trigger event (e.g., orientation trigger event). A trigger event can be the actuation or receipt of an input, the occurrence of a vehicle state, and/or be any other suitable trigger event. An input actuation can occur on (e.g., be received at or by) the vehicle (e.g., actuation of a manual orientation control of the vehicle), at a user device (e.g., received at a client of the user device, wherein the user device transmits an indication of the input to a communication module of the vehicle), and/or on any other suitable input. A vehicle state can be a stationary state (e.g., wherein the vehicle is not driving), a vehicle position (e.g., a predetermined location), a gear position (e.g., engaged parked gear), and/or any other suitable state.

The orientation can be an orientation of a vehicle frame reference element (e.g., a major plane of the frame, such as a horizontal plane or other broad face; frame axis, such as the longitudinal or lateral axis, etc.) with respect to gravity, a support surface, a nearby structure, auxiliary equipment, a second vehicle, portion of the wheel (e.g., rotational axis, wheel top, etc.), and/or any other suitable external reference, wherein the vehicle frame reference point can be normal to, parallel to, at a predetermined angle to, or otherwise oriented relative to the external reference. The vehicle frame height can be a first distance from the support surface (e.g., from a reference point on the frame to the support surface) and/or any other suitable height. The frame reference point can additionally or alternatively be a second distance from a wheel of the vehicle (e.g., the wheel mounted to the vehicle stabilization system, a wheel separate from the vehicle stabilization system, etc.), wherein the second distance can be equal to, less than, or greater than the first distance. Maintaining the vehicle height and/or orientation can enable and/or facilitate vehicle-related operations (e.g., cargo loading, firefighting, etc.), can increase occupant comfort (e.g., in a vehicle being used as a domicile), and/or can be serve any other purpose.

The vehicle height and/or orientation can be the vehicle ride height or orientation (e.g., height or orientation of the vehicle while driving), a vehicle height or orientation received from a user (e.g., entered into a client on the user's device, associated with a predetermined setting, etc.), or otherwise determined. The vehicle height can be achieved passively (e.g., with mechanical springs), actively (e.g., with pneumatic springs), or otherwise achieved. The vehicle height and orientation is preferably controlled by actuation of an active suspension of the vehicle, but can additionally or alternatively be controlled by any other suitable mechanism. For example, the active suspension can include one or more pneumatic springs (e.g., air springs), and the height and orientation can be controlled by introducing air to and/or releasing air from the springs. In a specific example, a control manifold is fluidly coupled to an interior of the pneumatic spring at an end of a port, a channel of the control manifold is fluidly coupled to a fluid source, and the control manifold includes an actuator configured to regulate pressurized fluid flow between the channel and the end of the port. In this specific example, actuating the pneumatic spring includes an electronic controller of the vehicle controlling the actuator. The actuation or other height/orientation control may be based on measurements from sensors, such as suspension position sensors, distance sensors (e.g., wheel distance, support surface distance, etc.), gravity sensors (e.g., accelerometers, level sensors, etc.), load sensors, pressure sensors, and/or any other suitable sensors. However, the vehicle height and/or orientation can be otherwise controlled.

While achieving and maintaining the desired vehicle height and orientation, the vehicle wheels preferably contact the support surface and cooperatively support substantially the entire weight of the vehicle (e.g., 1000 lbs, 2000 lbs, 20,000 lbs, 32,000 lbs, 34,000 lbs, 80,000 lbs, 1000-5000 lbs, 20,000-80,000 lbs, etc.), and the vehicle stabilizers are preferably retracted and not supporting the vehicle (e.g., the vehicle stabilizers are substantially unloaded, are not directly contacting the ground surface, are supporting less than a threshold proportion of the vehicle weight, etc.). However, the vehicle wheels and stabilizers can be otherwise configured while achieving and maintaining the desired vehicle height and orientation. In specific examples, each of four wheels may support approximately ¼ of the total vehicle weight, or each of eight wheels may support between ¹⁄₁₆ and ¼ of the total vehicle weight. The vehicle can be maintained in the driving configuration, and/or can be maintained at a different height and/or orientation (e.g., higher, lower, at an angle, etc.).

2.3 Stabilizing the Vehicle

Stabilizing the vehicle S230 functions to rigidly support the vehicle frame against the support surface. S230 can include deploying stabilizers S231, retracting wheels S232, locking stabilizers S233, and/or reducing stabilizer deployment actuation S234. S230 can be performed in response to S220, in response to detecting a trigger event (e.g., stabilizer trigger event), and/or at any other suitable time. The trigger event can be as described above, and/or can be any other suitable trigger event.

Deploying the stabilizers S231 functions to prepare the stabilizers to support and stabilize the vehicle. S231 preferably couples the frame to the support surface using the stabilizers (e.g., wherein each stabilizer extends from the frame to the support surface), but alternatively may extend the stabilizers to a position above the support surface, or may place the stabilizers in any other suitable position. The stabilizer extension length can be passively determined (e.g., the stabilizers deployed until a resistance force generated by stabilizers pushing against the ground surface precludes further extension), actively determined (e.g., the stabilizers deployed until a predetermined extension position is achieved), or otherwise determined. One, several, or all of the stabilizers can be deployed. The stabilizers can be deployed by actuating a stabilizer deployment mechanism, and this actuation is preferably sustained until performing S234. For example, in a system in which a stabilizer legs is connected to a stabilizer mount by a piston rod in a chamber, the stabilizer can be deployed by introducing a fluid (e.g., compressed air) to the chamber (e.g., by opening a valve using an actuator of a fluid controller, thereby fluidly coupling the chamber to a compressed air source), and the fluid is preferably retained in the chamber until S234 is performed. However, the stabilizers can be deployed in any other suitable manner.

In one variation, after (e.g., immediately following) S231, the stabilizers can contact (or are otherwise mechanically coupled to) the support surface, but preferably do not substantially lift the vehicle and do not substantially support the vehicle. Rather, the wheels preferably remain in contact with the support surface and continue to cooperatively support substantially all of the vehicle weight, and the vehicle height and orientation and wheel positions are substantially unchanged (e.g., the reference point remains the first distance from the ground and the second distance from the wheel). Alternatively, the stabilizers can lift the vehicle during S230 (e.g., thereby supporting some or all of the vehicle weight, moving the reference point of the frame farther from the support surface, etc.). In one variation, the vehicle is a semi-trailer, with one or more non-jacking stabilizers near some or all of the wheels (e.g., toward the rear of the semi-trailer) and one or more jacking stabilizers near the tractor coupling (e.g., toward the front). In this variation, the jacking stabilizers lift the vehicle during S231 and the non-jacking stabilizers do not.

Retracting the wheels S232 functions to transfer a portion of the vehicle weight onto the stabilizers. The portion of the vehicle weight transferred to the stabilizers can be the entire vehicle weight, a predetermined proportion of the vehicle weight (e.g., user specified, passively determined, etc.), or be any other suitable weight. In one example, the stabilizers can cooperatively support the vehicle weight with the vehicle wheels. In a second example, the stabilizers can support more weight than the vehicle wheels. However, the vehicle weight can be otherwise distributed between the stabilizers, wheels, or any other suitable support structure. One, several, or all of the wheels can be retracted. The wheels can be retracted in response to S231 and/or S233, in response to detecting a trigger event (e.g., wheel retraction trigger event, such as a user input to retract the wheels and/or confirmation that the stabilizers are prepared), and/or at any other suitable time.

The wheels are preferably retracted using the active suspension (and/or any other suitable components used in S220). For example, the wheels can be retracted by removing (e.g., releasing) air from the air springs (e.g., by controlling an actuator of a control manifold fluidly coupled to the spring interior to release air by opening an egress valve, sucking air out of the spring, or otherwise removing air from the air spring interior), thereby moving the wheels closer to the frame (e.g., a third distance less than the second distance) and farther from the support surface. As the wheels retract, the vehicle weight is transferred to the stabilizers. During S232, the frame may settle slightly onto the stabilizers, and/or its orientation may shift slightly, but the frame height and orientation preferably do not change substantially during the weight transfer. Alternatively, the frame may be lowered down during S232 until the stabilizers contact the support surface and support the vehicle, after which further wheel retraction causes the wheels to lift away from the support surface. After retraction, the wheels can remain in contact with the ground, can be just above the ground, can be a predetermined distance above the ground, can be retracted a predetermined distance from their initial positions, can be fully retracted, and/or can be retracted to any other suitable position.

Locking the stabilizers S233 functions to enable the stabilizers to support the vehicle weight (or a fraction thereof). The stabilizers are preferably locked before or during wheel retraction S232 (e.g., automatically in response to wheel retraction S232 beginning, in response to stabilizer deployment S231 completion, etc.), but can additionally or alternatively be locked at any other suitable time.

In a first variation, the system includes a passive locking mechanism that automatically locks the stabilizers. In a first example of this variation, the passive locking mechanism automatically locks when subjected to a compressive load greater than a threshold load (e.g., when supporting a predetermined fraction of the vehicle weight), such that S233 occurs automatically during S232 (e.g., once the vehicle weight shifted from the wheels to the stabilizer exceeds the threshold load). In a second example, the passive locking mechanism automatically locks when the stabilizer is extended. In a second variation, the system includes an active locking mechanism. In this variation, the active locking mechanism is preferably controlled to lock the stabilizer (e.g., a motorized latch is moved into a locked position, a dowel is manually inserted by a user, etc.) before or concurrent with S232. However, the stabilizers can be locked at any other suitable time.

Reducing stabilizer deployment actuation S234 functions to reduce or stop operation of the deployment mechanism when it is no longer needed. S234 is preferably performed after (e.g., in response to) stabilizer locking S233 (e.g., after actuating the locking mechanism; after determining that the stabilizers are locked, such as based on sensor measurements and/or user indications; after detecting a trigger event; etc.), but can be performed at any other suitable time. S234 can include disengaging, turning off, and/or reducing the power of a deployment mechanism, or otherwise reducing or eliminating a deployment force. In one example, S234 includes reducing the quantity of fluid within the stabilizer piston chamber (e.g., wherein the fluid controller controls an actuator of the control manifold to release some or all of the fluid) in response to wheel retraction. However, stabilizing the vehicle S230 can additionally or alternatively include any other suitable elements, and can be performed at any other suitable time.

2.4 Returning to Driving Configuration

Returning the vehicle to a driving configuration S240 functions to configure the vehicle for normal driving operation. S240 can include extending wheels S241, unlocking stabilizers S242, and/or disengaging stabilizers S243.

S240 is preferably performed after stabilizing the vehicle S230, and can be performed in response to detecting a trigger event (e.g., drive trigger event) or at any other suitable time. In one example, the drive trigger event includes receiving a user input at a user device. In a second example, the drive trigger event includes receiving a user input at an input on the vehicle (e.g., stabilizer retract button, transmission placed into gear, etc.) However, the trigger event can be any suitable event.

Extending the wheels S241 functions to transfer the vehicle weight to the wheels (e.g., off of the stabilizers). The wheels can be extended using the same system that was used to retract them (e.g., by increasing the quantity of pneumatic fluid within the pneumatic springs) and/or by any other suitable system. After wheel extension, the reference point of the frame is a fourth distance from the wheel and a fifth distance from the support surface. The fourth distance is preferably at least equal to the second distance and the fifth distance is preferably at least equal to the first distance. However, the fourth and fifth distances can be less than or otherwise related to the second and first distances, respectively. The wheels can lift the stabilizers off the support surface during extension (e.g., the fifth distance exceeds the first distance), or alternatively can not lift the stabilizers (e.g., the fifth distance equals the first distance).

Unlocking the stabilizers S242 functions to enable stabilizer disengagement. In a first variation, the stabilizers passively unlock as a consequence of wheel extension S241, vehicle weight shift to the wheels, or wheel loading (e.g., when the compressive load on the stabilizers is reduced or removed, wherein the compressive load locks the locking mechanism). In a second variation, the stabilizers are actively unlocked, preferably after wheel extension S241 or during S241 (e.g., after the vehicle weight has been transferred to the wheels). The stabilizers can be unlocked automatically (e.g., in response to wheel extension, in response to wheel loading detection and/or stabilizer deloading detection, in response to upward frame movement, etc.), unlocked in response to a trigger event (e.g., unlock trigger event), and/or unlocked at any other suitable time. The stabilizers can additionally or alternatively be unlocked manually or otherwise unlocked.

Disengaging the stabilizers S243 functions to enable driving by avoiding interference between the stabilizers and the support surface. S243 can include retracting the stabilizers and/or otherwise disengaging the stabilizers. The stabilizers are preferably automatically retracted passively as a consequence of unlocking S242 (e.g., by a passive retraction mechanism). In one example, the passive retraction mechanism includes a compression spring (e.g., coil spring) that is compressed during stabilizer deployment (e.g., compressed by a piston of the deployment mechanism during leg extension). In this example, while the stabilizer is deployed, the spring exerts a force to retract the stabilizer, but the force is insufficient to overcome the force exerted by the deployment mechanism when active (e.g., when the chamber is pressurized) and insufficient to defeat the locking mechanism when locked. Further, in this example, if the stabilizer is deployed, the deployment mechanism is not active, and the locking mechanism is unlocked, the retraction force from the spring will cause the stabilizer to retract. However, the stabilizers can additionally or alternatively be actively retracted (e.g., in response to S242, at any other suitable time; by an active retraction mechanism, manually by a user, etc.) or otherwise disengaged.

However, returning the vehicle to the driving configuration S240 can additionally or alternatively include any other suitable elements, and can be performed at any other suitable time. After returning the vehicle to the driving configuration S240, the vehicle can resume driving S210, controlling vehicle height and/or orientation S220, and/or stabilizing S230.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A vehicle comprising:
   a frame;
   a wheel;
   a control arm comprising:
      a first member connected to the frame; and
      a second member connected to the wheel and rotatably connected to the first member, the second member comprising an upper side and a lower side;
   a pneumatic spring defining a spring interior, the pneumatic spring comprising:
      a first spring end connected to the frame; and
      a second spring end connected to the second member of the control arm below the upper side;
   a stabilizer defining a chamber, the stabilizer comprising:
      a mount connected to the frame; and
      a leg comprising a first leg end and a second leg end, the leg connected to the mount proximal the first leg end;
   the stabilizer operable between:
      a retracted configuration wherein the second leg end is in a retracted position; and
      an extended configuration wherein the second leg end is in an extended position distal the mount relative to the retracted position;
      wherein the second leg end extends into the extended position in response to application of a pneumatic force on the chamber;
   a reservoir defining a reservoir interior; and
   a fluid manifold connected to the pneumatic spring and to the chamber, the fluid manifold fluidly coupling the spring interior and the chamber to the reservoir interior.

2. The vehicle of claim 1, wherein the stabilizer further comprises a passive locking mechanism configured to lock the stabilizer into the extended configuration.

3. The vehicle of claim 2, wherein the passive locking mechanism comprises a ratchet.

4. The vehicle of claim 2, wherein the stabilizer further comprises a passive retraction mechanism configured to retract the stabilizer into the retracted configuration.

5. The vehicle of claim 4, wherein the passive retraction mechanism comprises a spring.

6. The vehicle of claim 1, further comprising a jack connected to the frame opposing the stabilizer across a lateral vehicle midplane.

7. The vehicle of claim 1, further comprising a control manifold defining:
   a first, second, and third port, each port defining a first port end, a second port end, and a flow axis extending between the first and second port ends;
   a channel intersecting the first, second, and third ports between the respective first and second port ends;
   a cavity intersecting the second port ends of the first, second, and third ports; and
   a pressure sensor port separated from the first, second, and third ports and the channel by a thickness of the fluid manifold, the thickness configured to be selectively removed to fluidly connect the pressure sensor port and at least one of the first port, the second port, the third port, and the channel;
the control manifold comprising an actuator defining an actuation axis, the actuator arranged within the cavity with the actuation axis collinear the flow axis of the first port, wherein:
   the actuator is configured to regulate pressurized fluid flow between the channel and the first end of the first port; and
   the control manifold is fluidly coupled to the spring interior at the first port, fluidly coupled to the chamber at the second port, and fluidly coupled to the reservoir interior at the third port.

8. The vehicle of claim 7, wherein the control manifold further comprises a second actuator configured to regulate pressurized fluid flow between the channel and the first end of the second port; the vehicle further comprising an electronic controller configured to:
   control the actuator to regulate pressurized fluid flow between the channel and the first end of the first port; and
   control the second actuator to regulate pressurized fluid flow between the channel and the first end of the second port.

9. The vehicle of claim 8, wherein the actuator is the second actuator.

10. The vehicle of claim 7, further comprising:
    a compressor comprising an outlet connected to and fluidly coupled to the control manifold; and
    a bracket connected to the first member of the control arm, the reservoir, the compressor, and the control manifold.

11. A method for stabilizing a vehicle on a support surface, the vehicle comprising a frame, a wheel, a fluid spring coupling the wheel to the frame, and a stabilizer coupled to the frame, the stabilizer defining a chamber, the method comprising, at the vehicle:
    maintaining an orientation of the frame with respect to a gravity vector, comprising actuating the fluid spring, wherein:
       the wheel contacts the support surface; and
       a point of the frame is a first distance from the support surface and a second distance from a center of the wheel;
    in response to maintaining the orientation, coupling the frame to the support surface using the stabilizer by introducing a pneumatic fluid to the chamber of the stabilizer, wherein the wheel contacts the support surface; and
    in response to coupling the frame to the support surface using the stabilizer, retracting the wheel by reducing a quantity of fluid within the fluid spring such that:
       the point of the frame is a third distance from the center of the wheel, the third distance less than the second distance;

the point of the frame is substantially the first distance from the support surface; and the frame is substantially maintained in the orientation.

12. The method of claim 11, further comprising, before maintaining the orientation, while the vehicle is driving, actuating the fluid spring.

13. The method of claim 11, wherein the vehicle further comprises an electronic controller and a control manifold, the control manifold defining:
- a first and second port, each port defining a first port end, a second port end, and a flow axis extending between the first and second port ends;
- a channel intersecting the first and second ports between the respective first and second port ends;
- a cavity intersecting the second port ends of the first and second ports; and
- a pressure sensor port separated from the first port, the second port, and the channel by a thickness of the fluid manifold, the thickness configured to be selectively removed to fluidly connect the pressure sensor port and at least one of the first port, the second port, and the channel;

the control manifold comprising an actuator defining an actuation axis, the actuator arranged within the cavity with the actuation axis collinear the flow axis of the first port, wherein:
- the actuator is configured to regulate pressurized fluid flow between the channel and the first end of the first port;
- the control manifold is fluidly coupled to an interior of the fluid spring at the first port and fluidly coupled to the chamber at the second port;
- actuating the fluid spring comprises, by the electronic controller of the vehicle, controlling the actuator; and
- the fluid spring comprises a pneumatic spring.

14. The method of claim 13, wherein:
the control manifold further comprises a second actuator configured to regulate pressurized fluid flow between the channel and the first end of the second port; and
introducing the fluid to the chamber comprises, at the electronic controller, controlling the second actuator.

15. The method of claim 11, further comprising detecting a stabilizer trigger event, wherein introducing the fluid to the chamber is performed in response to detecting the stabilizer trigger event.

16. The method of claim 15, wherein detecting the stabilizer trigger event comprises detecting an actuation of a stabilizer trigger input of the vehicle.

17. The method of claim 15, wherein detecting the stabilizer trigger event comprises, at a client of a user device, detecting a stabilizer trigger user input.

18. The method of claim 15, wherein detecting the stabilizer trigger event comprises detecting a stationary state of the vehicle.

19. The method of claim 13, further comprising, at the vehicle:
- in response to retracting the wheel, reducing a quantity of the fluid within the chamber; and
- after reducing the quantity of the fluid within the chamber, extending the wheel by increasing the quantity of fluid within the fluid spring such that the point of the frame is a fourth distance from the center of the wheel, the fourth distance at least equal the second distance.

20. The method of claim 19, further comprising, in response to extending the wheel, automatically retracting the stabilizer by a passive retraction mechanism of the stabilizer.

* * * * *